(12) United States Patent
Nick et al.

(10) Patent No.: US 11,060,022 B2
(45) Date of Patent: *Jul. 13, 2021

(54) QUANTUM DOT-CONTAINING MATERIALS AND PRODUCTS INCLUDING SAME CROSS REFERENCE TO RELATED APPLICATIONS

(71) Applicant: SAMSUNG ELECTRONICS CO., LTD., Suwon-si (KR)

(72) Inventors: Robert J. Nick, Pepperell, MA (US); Whitney Miller, Lowell, MA (US)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/678,731

(22) Filed: Nov. 8, 2019

(65) Prior Publication Data

US 2020/0071607 A1 Mar. 5, 2020

Related U.S. Application Data

(62) Division of application No. 15/509,801, filed as application No. PCT/US2015/048916 on Sep. 8, 2015, now Pat. No. 10,513,656.

(60) Provisional application No. 62/047,616, filed on Sep. 8, 2014.

(51) Int. Cl.

| C09K 11/02 | (2006.01) |
| C09K 11/88 | (2006.01) |
| C09K 11/56 | (2006.01) |
| C08K 3/30 | (2006.01) |
| C09D 5/22 | (2006.01) |
| C09D 133/08 | (2006.01) |
| B82Y 20/00 | (2011.01) |
| B82Y 40/00 | (2011.01) |

(52) U.S. Cl.
CPC .............. *C09K 11/025* (2013.01); *C08K 3/30* (2013.01); *C09D 5/22* (2013.01); *C09D 133/08* (2013.01); *C09K 11/02* (2013.01); *C09K 11/565* (2013.01); *C09K 11/883* (2013.01); *B82Y 20/00* (2013.01); *B82Y 40/00* (2013.01); *C08K 2003/3036* (2013.01); *C08K 2201/011* (2013.01); *C08K 2201/014* (2013.01); *Y10S 977/774* (2013.01); *Y10S 977/824* (2013.01); *Y10S 977/892* (2013.01); *Y10S 977/896* (2013.01); *Y10S 977/95* (2013.01)

(58) Field of Classification Search
CPC .............................. C09K 11/025; B82Y 40/00
See application file for complete search history.

(56) References Cited

U.S. PATENT DOCUMENTS

| 5,831,774 | A | 11/1998 | Toshima et al. |
| 5,852,514 | A | 12/1998 | Toshima et al. |
| 5,903,391 | A | 5/1999 | Toshima et al. |
| 6,592,950 | B1 | 7/2003 | Toshima et al. |
| 6,602,596 | B2 | 8/2003 | Kimura et al. |
| 6,771,335 | B2 | 8/2004 | Kimura et al. |
| 7,156,547 | B2 | 1/2007 | Toshima et al. |
| 7,244,490 | B2 | 7/2007 | Nagami |
| 7,525,642 | B2 | 4/2009 | Mulder et al. |
| 8,718,437 | B2 | 5/2014 | Coe-Sullivan et al. |
| 10,513,656 | B2* | 12/2019 | Nick ........................ C09D 5/22 |
| 2003/0008244 | A1 | 1/2003 | Khanarian et al. |
| 2010/0119697 | A1 | 5/2010 | Baran, Jr. |
| 2011/0105643 | A1 | 5/2011 | Chun et al. |
| 2012/0113671 | A1 | 5/2012 | Sadasivan et al. |
| 2012/0187346 | A1 | 7/2012 | Chun et al. |
| 2013/0075692 | A1 | 3/2013 | Naasani et al. |
| 2013/0148376 | A1 | 6/2013 | Nick et al. |
| 2013/0260014 | A1 | 10/2013 | Clark et al. |

FOREIGN PATENT DOCUMENTS

| WO | 2009151515 | 12/2009 |
| WO | 2011047385 | 4/2011 |
| WO | 2011084833 | 7/2011 |
| WO | 2013078242 | 5/2013 |
| WO | 2013078245 | 5/2013 |
| WO | 2013078247 | 5/2013 |
| WO | 2013078249 | 5/2013 |
| WO | 2013078252 | 5/2013 |

(Continued)

OTHER PUBLICATIONS

International Search Report—PCT/2015/048916 dated Dec. 21, 2015.
Mike J. Idacavage, "Achieving Adhesion to Difficult Substrates", Adhesives & Sealants Industry, (Sep. 2, 2014), pp. 1-5.
Written Opinion—PCT/US2015/048916 dated Dec. 21, 2015.

*Primary Examiner* — C Melissa Koslow

(74) *Attorney, Agent, or Firm* — Cantor Colburn LLP

(57) ABSTRACT

A pre-polymer formulation comprising quantum dots and a precursor for a polymer having a free volume parameter $V_{FH2}/\gamma$ with a value less than or equal to 0.03 cm$^3$/g is disclosed. A pre-polymer formulation comprising quantum dots and a cyclohexylacrylate monomer is further disclosed. Also disclosed are a quantum dot composition including quantum dots dispersed in a polymer matrix, the quantum dot composition being prepared from a pre-polymer formulation comprising quantum dots and a precursor for a polymer having a free volume parameter $V_{FH2}/\gamma$ with a value less than or equal to cm$^3$/g; a method; and other products including a quantum dot composition described herein.

17 Claims, 9 Drawing Sheets

(56) References Cited

FOREIGN PATENT DOCUMENTS

| WO | 2013081432 | 6/2013 |
| WO | 2013122819 | 8/2013 |
| WO | 2013122820 | 8/2013 |
| WO | 2014018090 | 1/2014 |

\* cited by examiner

US 11,060,022 B2

QUANTUM DOT-CONTAINING MATERIALS AND PRODUCTS INCLUDING SAME CROSS REFERENCE TO RELATED APPLICATIONS

CROSS REFERENCE TO RELATED APPLICATIONS

This application is a divisional of U.S. Pat. No. 10,513,656 B2, filed on Mar. 8, 2017, which is a § 371 national stage entry application from International Application No. PCT/US2015/048916, filed on 8 Sep. 2015, which claims priority to U.S. Provisional Patent Application No. 62/047,616, filed on 8 Sep. 2014, which is hereby incorporated herein by reference in its entirety for all purposes.

TECHNICAL FIELD OF THE INVENTION

The present invention relates to the field of quantum dots, quantum dot-containing materials, and products thereof.

SUMMARY OF THE INVENTION

The present invention relates to quantum dot-containing materials and products thereof.

In accordance with one aspect of the present invention, there is provided a pre-polymer formulation comprising quantum dots and a precursor for a polymer having a free volume parameter $V_{FH2}/\gamma$ with a value less than or equal to 0.03 cm$^3$/g.

Examples of precursors for a polymer having a free volume parameter $V_{FH2}/\gamma$ with a value less than or equal to 0.03 cm$^3$/g include, for example, but are not limited to, a cyclohexylacrylate monomer, a butylacrylate monomer, a butlmethacrylate monomer, an ethylmethacrylate monomer, an ethylhexylmethacrylate monomer, an n-hexylmethacrylate monomer, an isobutylacrylate monomer, or an n-octylmethacrylate monomer.

In certain preferred embodiments, a precursor for a polymer having a free volume parameter $V_{FH2}/\gamma$ with a value less than or equal to 0.03 cm$^3$/g comprises a cyclohexylacrylate monomer.

The pre-polymer formulation can further comprise one or more additional components, including, for example, but not limited to, one or more of an adhesion promoter, a photoinitiator, scatterers, a thixotrope, an emission stabilizer, and a cross-linking agent.

In accordance with another aspect of the present invention, there is provided a pre-polymer formulation comprising quantum dots and a cyclohexylacrylate monomer.

The pre-polymer formulation can further comprise one or more additional components, including, for example, but not limited to, one or more of an adhesion promoter, a photoinitiator, scatterers, a thixotrope, an emission stabilizer, and a cross-linking agent.

In accordance with a further aspect of the present invention, there is provided a quantum dot composition including quantum dots dispersed in a polymer matrix, the quantum dot composition being prepared from a pre-polymer formulation comprising quantum dots and a precursor for a polymer having a free volume parameter $V_{FH2}/\gamma$ with a value less than or equal to 0.03 cm$^3$/g.

In certain preferred embodiments, a quantum dot composition is prepared from a pre-polymer formulation described herein.

Examples of precursors for a polymer having a free volume parameter VW/f with a value less than or equal to 0.03 cm$^3$/g include, for example, but are not limited to, a cyclohexylacrylate monomer, a butylacrylate monomer, a butylmethacrylate monomer, an ethylmethacrylate monomer, an ethylhexylmethacrylate monomer, an n-hexylmethacrylate monomer, an isobutylacrylate monomer, or an n-octylmethacrylate monomer.

In certain preferred embodiments, a precursor for polymer having a free volume parameter $V_{FH2}/\gamma$ with a value less than or equal to 0.03 cm$^3$/g comprises a cyclohexylacrylate monomer.

The pre-polymer formulation from which a quantum dot composition is prepared preferably further includes and adhesion promoter which becomes cross-linked into the polymer matrix of the quantum dot composition. Such adhesion promoter can be incorporated into the polymer matrix in an amount up to about 10 weight percent of the quantum dot composition. Other amount outside such range may also useful. An adhesion promoter can comprise a mixture of two or more adhesion promoters. Adhesion promoters are discussed in more detail below.

A quantum dot composition can further comprise one or more additional components, including, for example, but not limited to, one or more of scatterers, a thixotrope, and an emission stabilizer.

In accordance with another aspect of the present invention, there is provided a quantum dot composition including quantum dots dispersed in a polymer matrix, the quantum dot composition being prepared from a pre-polymer formulation comprising quantum dots and a cyclohexylacrylate monomer.

The pre-polymer formulation comprising quantum dots and a cyclohexylacrylate monomer from which such quantum dot composition is prepared preferably further includes and adhesion promoter which becomes cross-linked into the resulting cyclohexylacrylate-based polymer matrix of the quantum dot composition. Such adhesion promoter can be incorporated into the cyclohexylacrylate polymer in an amount up to about 10 weight percent of the quantum dot composition. Other amount outside such range may also useful. An adhesion promoter can comprise a mixture of two or more adhesion promoters. Adhesion promoters are discussed in more detail below.

A quantum dot composition can further comprise one or more additional components, including, for example, but not limited to, one or more of scatterers, a thixotrope, and an emission stabilizer.

In accordance with a further aspect of the present invention, there is provided an optical film comprising: a first substrate, a second substrate, and a quantum dot-containing layer disposed between the first and second substrates, the quantum dot-containing layer including a quantum dot composition including quantum dots dispersed in a polymer matrix, the quantum dot composition being prepared from a pre-polymer formulation comprising quantum dots and a precursor for a polymer having a free volume parameter $V_{FH2}/\gamma$ with a value less than or equal to 0.03 cm$^3$/g.

In certain preferred embodiments, a quantum dot composition is prepared from a pre-polymer formulation described herein Examples of precursors for a polymer having a free volume parameter $V_{FH2}/\gamma$ with a value less than or equal to 0.03 cm$^3$/g include, for example, but are not limited to, a cyclohexylacrylate monomer, a butylacrylate monomer, a butylmethacrylate monomer, an ethylmethacrylate monomer, an ethylhexylmethacrylate monomer, an n-hexylmethacrylate monomer, an isobutylacrylate monomer, or an n-octylmethacrylate monomer.

In certain preferred embodiments, a precursor for a polymer having a free volume parameter $V_{FH2}/\gamma$ with a value less than or equal to 0.03 cm$^3$/g comprises a cyclohexylacrylate monomer.

The quantum dot composition included in the optical film can comprise a quantum dot composition within the scope of the present invention.

In certain embodiments, the quantum dot-containing layer can be sealed between the first and second substrates.

Preferably, at least one of the first substrate and second substrate comprises a barrier film. In certain preferred embodiments, each of the first and second substrates comprises a barrier film.

In accordance with a further aspect of the present invention, there is provided an optical film comprising: a first substrate, a second substrate, and a quantum dot-containing layer disposed between the first and second substrates, the quantum dot-containing layer including a quantum dot composition including quantum dots dispersed in a polymer matrix, the quantum dot composition being prepared from a pre-polymer formulation comprising quantum dots and a cyclohexylacrylate monomer.

In certain preferred embodiments, a quantum dot composition is prepared from a pre-polymer formulation including quantum dots and a cyclohexylacrylate monomer described herein.

The quantum dot composition included in the optical film can comprise a quantum dot composition including quantum dots dispersed in a polymer matrix, the quantum dot composition being prepared from a pre-polymer formulation comprising quantum dots and a cyclohexylacrylate monomer within the scope of the present invention.

In certain embodiments, the quantum dot-containing layer can be sealed between the first and second substrates.

Preferably, at least one of the first substrate and second substrate comprises a barrier film. In certain preferred embodiments, each of the first and second substrates comprises a barrier film.

In accordance with a yet another aspect of the present invention, there is provided an optical film comprising a first substrate, a second substrate, and a quantum dot-containing layer disposed between the first and second substrates, and at least one tie layer comprising an adhesion promoter disposed between the quantum dot-containing layer and at least one of the first substrate and the second substrate, the quantum dot-containing layer including a quantum dot composition including quantum dots dispersed in a polymer matrix, the quantum dot composition being prepared from a pre-polymer formulation comprising quantum dots and a precursor for a polymer having a free volume parameter $V_{FH2}/\gamma$ with a value less than or equal to 0.03 cm$^3$/g.

In certain preferred embodiments, a quantum dot composition is prepared from a pre-polymer formulation described herein.

Examples of precursors for a polymer having a free volume parameter $V_{FH2}/\gamma$ with a value less than or equal to 0.03 cm$^3$/g include, for example, but are not limited to, a cyclohexylacrylate monomer, a butylacrylate monomer, a butylmethacrylate monomer, an ethylmethacrylate monomer, an ethylhexylmethacrylate monomer, an n-hexylmethacrylate monomer, an isobutylacrylate monomer, or an n-octylmethacrylate monomer.

In certain preferred embodiments, a precursor for a polymer having a free volume parameter $V_{FH2}/\gamma$ with a value less than or equal to 0.03 comprises a cyclohexylacrylate monomer.

The quantum dot composition included in the optical film can comprise a quantum dot composition within the scope of the present invention.

In certain embodiments, the quantum dot-containing layer can be sealed between the first and second substrates.

Preferably, at least one of the first substrate and second substrate comprises a barrier film. In certain preferred embodiments, each of the first and second substrates comprises a barrier film.

In accordance with a yet another aspect of the present invention, there is provided an optical film comprising a first substrate, a second substrate, and a quantum dot containing layer disposed between the first and second substrates, and at least one tie layer comprising an adhesion promoter disposed between the quantum dot-containing layer and at least one of the first and second substrates, the quantum dot-containing layer including a quantum dot composition including quantum dots dispersed in a polymer matrix, the quantum dot composition being prepared from a pre-polymer formulation comprising quantum dots and a cyclohexylacrylate monomer.

In certain preferred embodiments, a quantum dot composition is prepared from a pre-polymer formulation including quantum dots and a cyclohexylacrylate monomer described herein.

The quantum dot composition included in the optical film can comprise a quantum dot composition including quantum dots dispersed in a polymer matrix, the quantum dot composition being prepared from a pre-polymer formulation comprising quantum dots and a cyclohexylacrylate monomer within the scope of the present invention.

In certain embodiments, the quantum dot-containing layer can be sealed between the first and second substrates.

Preferably, at least one of the first substrate and second substrate comprises a barrier film. In certain preferred embodiments, each of the first and second substrates comprises a barrier film.

In accordance with a yet another aspect of the present invention, there is provided an optical component comprising a quantum dot composition including quantum dots dispersed in a polymer matrix, the quantum dot composition being prepared from a pre-polymer formulation comprising quantum dots and a precursor for a polymer having a free volume parameter $V_{FH2}/\gamma$ with a value less than or equal to 0.03 cm$^3$/g, the quantum dot composition being sealed within an optically transparent member.

In certain preferred embodiments, a quantum dot composition is prepared from a pre-polymer formulation described herein.

Examples of precursors for a polymer having a free volume parameter VF/Y with a value less than or equal to 0.03 cm$^3$/g include, for example, but are not limited to, a cyclohexylacrylate monomer, a butylacrylate monomer, a butylmethacrylate monomer, an ethylmethacrylate monomer, an ethylhexylmethacrylate monomer, an n-hexylmethacrylate monomer, an isobutylacrylate monomer, or an n-octylmethacrylate monomer.

In certain preferred embodiments, a precursor for a polymer having a free volume parameter $V_{FH2}/\gamma$ with a value less than or equal to 0.03 cm$^3$/g comprises a cyclohexylacrylate monomer.

The quantum dot composition included in the optical film can comprise the quantum dot composition within the scope of the present invention.

In accordance with a yet another aspect of the present invention, there is provided an optical component comprising provided a quantum dot composition including quantum dots dispersed in a polymer matrix, the quantum dot composition being prepared from a pre-polymer formulation comprising quantum dots and a cyclohexylacrylate monomer, the quantum dot composition being sealed within an optically transparent member.

In certain preferred embodiments, a quantum dot composition is prepared from a pre-polymer formulation including quantum dots and a cyclohexylacrylate monomer described herein.

The quantum dot composition included in the optical film can comprise a quantum dot composition including quantum dots dispersed in a polymer matrix, the quantum dot composition being prepared from a pre-polymer formulation comprising quantum dots and a cyclohexylacrylate monomer within the scope of the present invention.

In accordance with yet another aspect of the present invention, there is provided a method for curing a pre-polymer formulation comprising quantum dots and a cyclohexylacrylate monomer, the method comprising exposing the pre-polymer to UV radiation for more than 30 seconds.

In accordance with yet further aspect of the present invention, there are provided displays and backlight units including a quantum dot composition described herein, displays and backlight units including an optical film described herein, and displays and backlight units including an optical component described herein.

The foregoing, and other aspects described herein, all constitute embodiments of the present invention.

It should be appreciated by those persons having ordinary skill in the art(s) to which the present invention relates that any of the features described herein in respect of any particular aspect and/or embodiment of the present invention can be combined with one or more of any of the other features of any other aspects and/or embodiments of the present invention described herein, with modifications as appropriate to ensure compatibility of the combinations. Such combinations are considered to be part of the present invention contemplated by this disclosure.

It is to be understood that both the foregoing general description and the following detailed description are exemplary and explanatory only and are not restrictive of the invention as claimed.

Other embodiments will be apparent to those skilled in the art from consideration of the description and drawings, from the claims, and from practice of the invention disclosed herein.

Figure 1A:
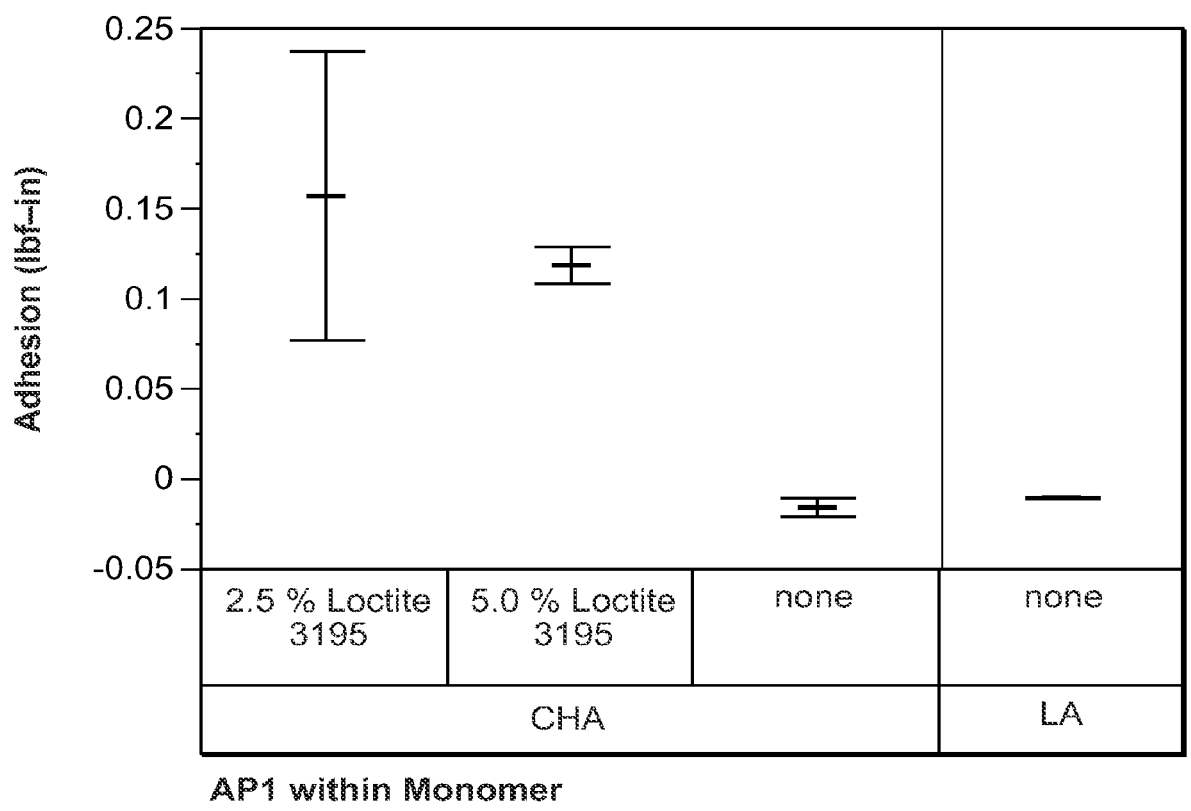
FIG. 1A graphically represents adhesion (measured in pound force inch (lbf-in)) for optical films including a quantum dot-containing layer prepared from formulations as described in Examples 5-10.

The attached figures are simplified representations presented for purposes of illustration only; the actual structures may differ in numerous respects, particularly including the relative scale of the articles depicted and aspects thereof.

For a better understanding to the present invention, together with other advantages and capabilities thereof, reference is made to the following disclosure and appended claims in connection with the above-described drawings.

DETAILED DESCRIPTION OF THE INVENTION

Various aspects and embodiments of the present inventions will be further described in the following detailed description.

In accordance with another aspect of the present invention, there is provided a pre-polymer formulation comprising quantum dots and a cyclohexylacrylate monomer.

Quantum dots included in a pre-polymer formulation are preferably selected based on the desired peak emission wavelength or combinations of wavelengths desired for the particular intend end-use application for the pre-polymer formulation.

The total amount of quantum dots included in a pre-polymer formulation within the scope of the invention is preferably in a range from about 0.01 to about 25 weight percent, and any weight percent in between. For example, an amount in a range from about 0.05 weight percent to about 15 weight percent, or about 0.05 weight percent to about 5 weight percent can be desirable for various applications. Such amounts are not intended to be limiting. An amount outside of such ranges may also be determined to be useful.

The amount of quantum dots included in a pre-polymer formulation can vary based on the particular end application.

Quantum dots are discussed in more detail below.

The pre-polymer formulation can further comprise one or more additional components, including, for example, but not limited to, one or more of an adhesion promoter, a photoinitiator, scatterers, a thixotrope, an emission stabilizer, a cross-linking agent.

In certain embodiments, the additional components do not include an epoxy-containing material or other epoxy functionality.

In certain embodiments, the pre-polymer formulation does not include an epoxy-containing material or other epoxy functionality.

An adhesion promoter can preferably be included in the pre-polymer formulation, for example, in an amount in the range from about 0.01 weight percent to about 10 weight percent of the formulation. Other amount outside such range may also useful. Nonlimiting exemplary amounts include 2.5 weight percent and 5 weight percent.

An adhesion promoter can comprise a single adhesion promoter or a mixture of two or more different adhesion promoters.

An adhesion promoter can be preferably included in a pre-polymer formulation for use in applications in which adhesion of the cured formulation to a surface is desired.

A preferred example of an adhesion promoter includes, but is not limited to, UV light curable acrylic-based optically clear adhesives, such as LOCTITE 3195, available from Henkel Corporation.

Additional examples of adhesion promoters include UV light curable acrylic-based optically clear adhesives with properties similar to LOCTITE 3195; GELEST PRIMER A1 (a vinyltriethoxysilane-1,2-butadiene copolymer), available from Gelest, Inc., Morrisville, Pa. USA, bis[2-(methyloyloxy)ethyl]phosphate (BMEP), available from Sigma Aldrich, Saint Louis, Mo. USA, PL-2110 available from ESSTECH, Inc., Essington, Pa. USA (a methacrylate monomer base structure including a phosphate functionality); PL-2212 available from ESSTECH, Inc., Essington, Pa. USA (an acrylate monomer base structure including a carboxylate functionality); and N-methyl-aza-2,2,4-trimethylsilacyclopentane (cyclic silazane). Other adhesion promoters compatible with the quantum dots and the monomer may be determined by the skilled artisan to be useful.

For additional information about PL-2110 and P-2112, see "Achieving Adhesion to Difficult Substrates", by Mike J. Idacavage, published in the September 2014 issue of *Adhesives & Sealants Industry*, which is hereby incorporated herein by reference.

Optionally, an adhesion promoter comprises a mixture of two or more adhesion promoters. A non-limiting example of a mixture of adhesion promoters includes, but is not limited to, a mixture of a UV light curable acrylic-based optically clear adhesive, such as LOCTITE 3195, and one or more of GELEST PRIMER A1, bis[2-(methyloyloxy)ethyl]phosphate (BMEP), PL-2110, PL-2212, and N-methyl-aza-2,2,4-trimethylsilacyclopentane (cyclic silazane). A non-limiting example of such mixture of adhesion promoters can include a first adhesion promoter, e.g., UV light curable acrylic-based optically clear adhesive, such as LOCTITE 3195, in an amount of 5 weight percent based on the pre-polymer formulation weight and from 0.05 to 0.5 weight percent each of any one or more of other adhesion promoters included in the mixture.

Scatterers, within the scope of the disclosure may be present, for example, in an amount from about 0.01 weight percent to about 15 weight percent. Amounts of scatterers outside such range may also be useful. Nonlimiting exemplary amounts include amounts in a an amount from about 0.01 weight percent to about 2 weight percent, or about 0.1 weight percent to about 1 weight percent. Examples of light scatterers (also referred to herein as light scatterers, light scattering particles, or light scattering agents) that can be used in the embodiments and aspects of the inventions described herein, include, without limitation, metal or metal oxide particles, air bubbles, and glass and polymeric beads (solid or hollow). Other scatterers can be readily identified by those of ordinary skill in the art. In certain embodiments, scatterers have a spherical shape Preferred examples of scattering particles include, but are not limited to, $TiO_2$, $SiO_2$, $BaTiO_3$, $BaSO_4$, and ZnO. Particles of other materials that are non-reactive with the host material and that can increase the absorption pathlength of the excitation light in the host material can be used. In certain embodiments, light scatterers may have a high index of refraction (e.g., $TiO_2$, $BaSO_4$, etc.) or a low index of refraction (gas bubbles). Scatterers are preferably non-luminescent.

Scatterers can comprise a single type of scatterer or a mixture of two or more different types of scatterers.

Selection of the size and size distribution of the scatterers is readily determinable by those of ordinary skill in the relevant art. The size and size distribution can be based upon the refractive index mismatch of the scattering particle and the cyclohexyl acrylate monomer or other polymer precursor in which the scatterers are to be dispersed, and the preselected wavelength(s) to be scattered according to light scattering theory, e.g., Rayleigh or Mie scattering theory. The surface of the scattering particle may further be treated to improve dispersability and stability in the host material. In one embodiment, the scattering particle comprises $TiO_2$ (R902+ from DuPont) having a 0.405 μm median particle size and are included in a pre-polymer formulation in a concentration in a range from about 0.01 to about 1% by weight.

The amount of the scatterers may be altered relative to the amount of quantum dots used in the formulation. For example, when the amount of the scatter is increased, the amount of quantum dots may be decreased.

A pre-polymer formulation of the present invention can further include a thixotrope.

A thixotrope can comprise a single thixotrope or a mixture of two or more thixotropes.

Examples of thixotropes (which may also referred to as rheology or viscosity modifiers) which may be included in a pre-polymer formulation include, but are not limited to, fumed metal oxides (e.g., fumed silica which can be surface treated or untreated (such as CAB-O-SIL™ fumed silica products available from Cabot Corporation, including, but not limited to, CAB-O-SIL TS720 and CAB-O-SIL TS610), or fumed metal oxide gels (e.g., a silica gel). A pre-polymer formulation can include an amount of thixotrope in an amount greater than zero up to about 15 weight percent of the pre-polymer formulation. For example, a thixotrope can be included in the formulation in an amount in a range from about 5 to about 12 weight percent of the formulation. Other amounts outside the range may also be determined to be useful.

A pre-polymer formulation of the present invention can further include a photoinitiator.

A photoinitiator can comprise a single photoinitiator or a mixture of two or more photoinitiators.

Nonlimiting examples of photoinitiators include IRGACURE 2022, KTO-46 (Lambert), Esacure 1 (Lambert) and the like.

Photoinitiators can be included in the polymerizable formulation in an amount from about 0.01% to about 10% weight percent of the pre-polymer formulation. For example, a photoinitiator can be included in the formulation in an amount in a range from about 1 to about 5 weight percent of the formulation. Other amounts outside the above ranges may also be determined to be useful.

Photoinitiators generally help to sensitize the polymerizable composition to UV light for photopolymerization.

A pre-polymer formulation can further include an emission stabilizer. Emission stabilizers, examples of emission stabilizers, and other information concerning the use of emission stabilizers are included in international Application No PCT/US2012/066151, entitled "Quantum Dot-Containing Compositions Including an Emission Stabilizer, Products Including Same, And Method" of QD Vision, Inc., filed 20 Nov. 2012, which published as WO 2013/078252 on 30 May 2013, which is hereby incorporated herein by reference in its entirety.

In an embodiment, the composition includes the emission stabilizer in an amount greater than 0 up to about 10 weight percent of the composition. An emission stabilizer can be included in the pre-polymer formulation in an amount greater than 0 up to about 10 weight percent of the formulation. Other amounts outside this range may also be determined to be useful.

In many embodiments, an emission stabilizer preferably includes at least one of potassium dodecyl phosphate and trioctyl phosphine oxide.

A pre-polymer formulation can further include a cross-linking agent.

A cross-linking agent can comprise a single cross-linking agent or a mixture of two or more cross-linking agents.

Nonlimiting examples of cross-linking agents include ethylene glycol dimethacrylate EBECRYL 150 and the like.

Crosslinking agents can be included in the pre-polymer formulation in an amount from about 0.5 to about 30.0 weight percent of the pre-polymer formulation. For example, crosslinking agents can be included in the pre-polymer formulation in an amount from about 0.5 to about 15.0 weight percent or from about 0.5 to about 3.0 weight percent of the formulation. Crosslinking agents are generally added, for example in an amount of about 1% weight percent to improve stability and strength of a polymer which helps avoid cracking of the polymer due to shrinkage upon curing of the polymer.

A pre-polymer formulation may include no cross-linking agent.

In accordance with another aspect of the present invention, there is provided a quantum dot composition including quantum dots dispersed in a polymer matrix, the quantum dot composition being prepared from a pre-polymer formulation comprising quantum dots and a cyclohexylacrylate monomer.

Quantum dots included in a quantum dot composition are preferably selected based on the desired peak emission wavelength or combinations of wavelengths desired for the particular intend end-use application for the quantum dot composition.

The total amount of quantum dots included in a quantum dot composition within the scope of the invention is preferably in a range from about 0.01 to about 25 weight percent, and any weight percent in between. For example, an amount in a range from about 0.05 weight percent to about 15 weight percent, or about 0.05 weight percent to about 5 weight percent can be desirable for various applications. Such amounts are not intended to be limiting. An amount outside of such ranges may also be determined to be useful. The amount of quantum dots included in a quantum dot composition can vary based on the particular end application.

Quantum dots are discussed in more detail below.

The pre-polymer formulation comprising quantum dots and a cyclohexylacrylate monomer from which such quantum dot composition is prepared and preferably further includes and adhesion promoter which becomes cross-linked into the resulting cyclohexylacrylate-based polymer matrix of the quantum dot composition. Such adhesive promoter can be incorporated into the cyclohexylacrylate polymer in an amount up to about 10 weight percent of the quantum dot composition Other amount outside such range may also useful.

An adhesion promoter can comprise a single adhesion promoter or a mixture of two or more different adhesion promoters.

An adhesion promoter can be preferably included in a quantum dot composition for use in applications in which adhesion of the cured composition to a surface is desired.

A preferred example of an adhesion promoter includes, but is not limited to, UV light curable acrylic-based optically clear adhesives, such as LOCTITE 3195, available from Henkel Corporation.

Other examples of adhesion promoters include UV light curable acrylic-based optically clear adhesives with properties similar to LOCTITE 3195; GELEST PRIMER A1, available from Gelest, Inc., Morrisville, Pa. USA; bis[2-(methyloyloxy)ethyl]phosphate (BMEP) available from Sigma Aldrich. Saint Louis, Mo. USA; PL-2110 available from ESSTECH, Inc., Essington, Pa. USA, (a methacrylate monomer base structure including a phosphate functionality); PL-2212 available from ESSTECH, Inc., Essington, Pa. USA (an acrylate monomer base structure including a carboxylate functionality); and N-methyl-aza-2,2,4-trimethyl-silacyclopentane (cyclic silazane).

Optionally, an adhesion promoter comprises a mixture of two or more adhesion promoters. A non-limiting example of a mixture of adhesion promoters includes, but is not limited to, a mixture of a UV light curable acrylic-based optically clear adhesive, such as LOCTITE 3195, and one or more of GELEST PRIMER A1, bis[2-(methyloyloxy)ethyl]phosphate (BMEP), PL-2110, PL-2212, and N-methyl-aza-2,2,4-trimethylsilacyclopentane (cyclic silazane). A non-limiting example of such mixture of adhesion promoters can include a first adhesion promoter, e.g., UV light curable acrylic-based optically clear adhesive, such as LOCTITE 3195, in an amount of 5 weight percent based on the pre-polymer formulation weight and from 0.05 to 0.5 weight percent each of any one or more of other adhesion promoters included in the mixture.

In certain embodiments, an adhesion promoter does not include an epoxy-containing material or other epoxy functionality.

A quantum dot composition can further comprise one or more additional components, including, for example, but not limited to, one or more of scatterers, a thixotrope, and an emission stabilizer.

In certain embodiments, the additional components do not include an epoxy-containing material or other epoxy functionality.

Scatterers, within the scope of the disclosure may be included, for example, in an amount from about 0.01 weight percent to about 15 weight percent Amounts of scatterers outside such range may also be useful. Nonlimiting exemplary amounts include amounts in a an amount from about 0.01 weight percent to about 2 weight percent, or about 0.1 weight percent to about 1 weight percent. Examples of scatterers (which may also be referred to herein as light scatterers, light scattering particles, scattering particles, or light scattering agents) that can be used in the embodiments and aspects of the inventions described herein, include, without limitation, metal or metal oxide particles, air bubbles, and glass and polymeric beads (solid or hollow). Other scatterers can be readily identified by those of ordinary skill in the art. In certain embodiments, scatterers have a spherical shape. Preferred examples of scattering particles include, but are not limited to, $TiO_2$, $SiO_2$, $BaTiO_3$, $BaSO_4$, and ZnO. Particles of other materials that are non-reactive with the host material and that can increase the absorption pathlength of the excitation light in the host material can be used. In certain embodiments, light scatterers may have a high index of refraction (e.g., $TiO_2$, $BaSO_4$, etc.) or a low index of refraction (gas bubbles). Scatterers are preferably non-luminescent or non-emissive.

Scatterers can comprise a single type of scatterer or a mixture of two or more different types of scatterers.

Selection of the size and size distribution of the scatterers is readily determinable by those of ordinary skill in the relevant art. The size and size distribution can be based upon the refractive index mismatch of the scattering particle and the cyclohexyl acrylate monomer or other polymer precursor in which the scatterers are to be dispersed, and the preselected wavelength(s) to be scattered according to light scattering theory, e.g., Rayleigh or Mie scattering theory. The surface of the scattering particle may further be treated to improve dispensability and stability in the host material. In one embodiment, the scattering particle comprises $TiO_2$ (R902+ from DuPont) having a 0.405 µm median particle size and are included in a quantum dot composition in a concentration in a range from about 0.01 to about 1% by weight.

The amount of the scatterers may be altered relative to the amount of quantum dots used in the composition. For example, when the amount of the scatter is increased, the amount of quantum dots may be decreased.

A quantum dot composition of the present invention can further include a thixotrope.

A thixotrope can comprise a single thixotrope or a mixture of two or more thixotropes.

Examples of thixotropes (which may also referred to as rheology or viscosity modifiers) which may be included in a quantum dot composition include, but are not limited to, fumed metal oxides (e.g., fumed silica which can be surface treated or untreated (such as CAB-O-SL™ fumed silica products available from Cabot Corporation, including, but not limited to, CAB-O-SIL TS720 and CAB-O-SIL TS610), or fumed metal oxide gels (e.g., a silica gel). A quantum dot composition can include an amount of thixotrope in an amount greater than zero up to about 15 weight percent of the quantum dot composition. For example, a thixotrope can be included in the composition in an amount in a range from about 5 to about 12 weight percent of the formulation. Other amounts outside the range may also be determined to be useful.

A quantum dot composition can further include an emission stabilizer. Emission stabilizers, examples of emission stabilizers, and other information concerning the use of emission stabilizers are included in International Application No. PCT/US2012/066151, entitled "Quantum Dot-Containing Compositions Including an Emission Stabilizer, Products Including Same, And Method" of QD Vision, Inc., filed 20 Nov. 2012, which published as WO 2013/078252 on 30 May 2013, which is hereby incorporated herein by reference in its entirety.

An emission stabilizer can be included in the quantum dot composition in an amount greater than 0 up to about 10 weight percent of the composition. Other amounts outside this range may also be determined to be useful.

In many embodiments, an emission stabilizer preferably includes at least one of potassium dodecyl phosphate and trioctyl phosphine oxide.

In certain embodiments, the quantum dot composition does not include an epoxy-containing material or other epoxy functionality.

In accordance with a further aspect of the present invention, there is provided an optical film comprising: a first substrate, a second substrate, and a quantum dot-containing layer disposed between the first and second substrates, the quantum dot-containing layer including a quantum dot composition including quantum dots dispersed in a polymer matrix, the quantum dot composition being prepared from a pre-polymer formulation comprising quantum dots and a cyclohexylacrylate monomer.

Figure 8:
FIG. 8 depicts a cross-sectional view of an example of an embodiment of an optical film in accordance with one aspect of the invention.

FIG. 8 depicts a cross-sectional side view of an example of an embodiment of an optical film in accordance with the present invention. As shown, the optical film 1 includes a quantum dot-containing layer 20 disposed between a first substrate 10 and a second substrate 30. The first substrate and the second substrate can be the same or different.

In certain preferred embodiments, a quantum dot composition is prepared from a pre-polymer formulation including quantum dots and a cyclohexylacrylate monomer described herein.

A quantum dot-containing layer can comprise a quantum dot composition in accordance with the present invention.

The quantum dot composition included in an optical film can comprise a quantum dot composition including quantum dots dispersed in a polymer matrix, the quantum dot composition being prepared from a pre-polymer formulation comprising quantum dots and a cyclohexylacrylate monomer in accordance with an aspect of the present invention, described herein.

As provided above, the pre-polymer formulation comprising quantum dots and a cyclohexylacrylate monomer from which such quantum dot composition is prepared preferably further includes and adhesion promoter which becomes cross-linked into the resulting cyclohexylacrylate-based polymer matrix of the quantum dot composition.

Optionally, two or more adhesion promoters can also be included in the polymer matrix by cross-linking.

In certain embodiments, an adhesion promoter does not include an epoxy-containing material or other epoxy functionality.

The quantum dot composition can further comprise one or more additional components, including, for example, one or more of scatterers, a thixotrope, and an emission stabilizer, as provided above.

In certain embodiments, the additional components do not include an epoxy-containing material or other epoxy functionality.

In certain embodiments, the quantum dot composition does not include an epoxy-containing material or other epoxy functionality.

In certain embodiments, the quantum dot-containing layer can be sealed between the first and second substrates.

Examples of preferred substrates include glass, polycarbonate, acrylic, quartz, sapphire, a polymeric material such as plastic or silicone (e.g. but not limited to thin acrylic, epoxy, polycarbonate, PEN, PET, PE).

In certain preferred embodiments, a substrate is optically transparent to at least light having predetermined wavelengths of light passing through it. In certain embodiments, a substrate is at least 80% optically transparent to at least predetermined wavelengths of light passing through it. In certain embodiments, a substrate is at least 85% optically transparent to at least predetermined wavelengths of light passing through it. In certain embodiments, a substrate is at least 90% optically transparent to at least predetermined wavelengths of light passing through it. In certain embodiments, a substrate is at least 95% optically transparent to at least predetermined wavelengths of light passing through it. In certain embodiments, a substrate is at least 99% optically transparent to at least predetermined wavelengths of light passing through it.

The geometrical shape and dimensions of a substrate can be selected based on the particular end-use application.

Preferably, at least one of the first substrate and second substrate comprises a barrier film. In certain preferred embodiments, both substrates comprise a barrier film.

A barrier film can be formed of any useful film material that can protect the quantum dots from oxygen and moisture. Examples of materials that can be used to form a barrier film include polymers, glass or dielectric materials. More particular examples of barrier materials include, but are not limited to, polymers such as polyethylene terephthalate (PET), oxides such as silicon oxide, titanium oxide, or aluminum oxide.

A barrier film optionally comprises two or more layers, which can be the same or different. In certain embodiments a barrier coating can be applied to a barrier film.

Example of suitable barrier films or coatings include, without limitation, a hard metal oxide coating, a thin glass layer, and BARIX coating materials available from Vitex Systems, Inc. Other suitable barrier films or coating can be readily ascertained by one of ordinary skill in the art.

The composition of a barrier film, thickness, and number of barrier layers will be selected based on the desired protection level for the quantum dots from oxygen and moisture as well as the intended end-use application.

In certain preferred embodiments, a barrier material is optically transparent to at least light having predetermined wavelengths of light passing through it. In certain embodiments, a barrier material is at least 80% optically transparent to at least predetermined wavelengths of light passing through it. In certain embodiments, a barrier material is at least 85% optically transparent to at least predetermined wavelengths of light passing through it. In certain embodiments, a barrier material is at least 90 optically transparent to at least predetermined wavelengths of light passing through it. In certain embodiments, a barrier material is at least 95% optically transparent to at least predetermined wavelengths of light passing through it. In certain embodiments, a barrier material is at least 99% optically transparent to at least predetermined wavelengths of light passing through it.

In certain preferred embodiments, a barrier material does not yellow or discolor so as alter the optical properties of light passing through it in an undesired way.

In certain preferred embodiments, a barrier material does not partially or fully delaminate during the useful lifetime of the optical film.

Optionally, an optical film can include additional layers.

An optical film can further optionally include one or more light diffusion layers disposed between the quantum dot-containing layer and the light-emitting surface of the optical film.

Examples of suitable commercially available light diffusion layers include, but are not limited to, the following light diffusion films available from KIMOTO Co Ltd., Shinjuku Office, 1-5 Yoyogi 2-chome, Shibuya-ku, Tokyo 151-0053 JAPAN: KIMOTO Diffusion Film-Light-Up 100NSH, KIMOTO Diffusion Film—Light-Up 100MXE, KIMOTO Diffusion Film-Light-Up 100SXE, KIMOTO Diffusion Film—Light-Up 100LSE, KIMOTO Diffusion Film-Light-Up 100GM2, and KIMOTO Light Diffusion Film—Chem Mat 125PW. The KIMOTO Light Diffusion Film General Specification Sheets for the above-listed Films being hereby incorporated herein by reference in their entireties. Additional information concerning KIMOTO Light-Up Films can be found in U.S. Pat. Nos. 5,831,774, 5,852,514; 5,903, 391, 6,592,950; 6,602,596; 6,771,335; 7,156,547; 7,244, 490; and 7,525,642, which are hereby incorporated herein by reference in their entireties. Other suitable light diffusion layers can be used.

In accordance with a yet another aspect of the present invention, there is provided an optical film comprising a first substrate, a second substrate, and a quantum dot-containing layer disposed between the first and second substrates, and at least one tie layer comprising an adhesion promoter disposed between the quantum dot-containing layer and at least one of the first and second substrates, the quantum dot-containing layer including a quantum dot composition including quantum dots dispersed in a matrix comprising a cyclohexylacrylate polymer.

FIG. 8 depicts a cross-sectional side view of an example of an embodiment of an optical film in accordance with the present invention. As shown, the optical film 1 includes a quantum dot-containing layer 20 disposed between a first substrate 10 and a second substrate 30. The first substrate and the second substrate can be the same or different (A tie layer is not shown in the optical film example depicted in the figure.)

A quantum dot-containing layer can comprise a quantum dot composition in accordance with the present invention.

In certain preferred embodiments, a quantum dot composition is prepared from a pre-polymer formulation including quantum dots and a cyclohexylacrylate monomer described herein.

The quantum dot composition included in an optical film can comprise a quantum dot composition including quantum dots dispersed in a polymer matrix, the quantum dot composition being prepared from a pre-polymer formulation comprising quantum dots and a cyclohexylacrylate monomer in accordance with an aspect of the present invention, described herein.

A polymer matrix included in the quantum dot composition can preferably further include an adhesion promoter cross-linked into the polymer matrix, as described herein.

As provided above, the pre-polymer formulation comprising quantum dots and a cyclohexylacrylate monomer from which such quantum dot composition is prepared preferably further includes and adhesion promoter which becomes cross-linked into the resulting cyclohexylacrylate-based polymer matrix of the quantum dot composition.

Optionally, two or more adhesion promoters can also be included in the polymer matrix by cross-linking.

A tie layer can be a layer or coating comprising an adhesion promoter.

An adhesion promoter included in a tie layer can comprise an adhesion promoter described herein. As also discussed herein, an adhesion promoter can comprise a mixture of two or more adhesion promoters.

A tie layer comprising an adhesion promoter is preferably disposed between the quantum dot-containing layer and the inner-facing surface of at least one of the substrates as a surface treatment coating on the inner-facing surface of one or both of the substrates. In certain preferred embodiments, a tie layer comprising an adhesion promoter is preferably disposed between the quantum dot-containing layer and the inner-facing surfaces both of the substrate as a surface treatment coating on the inner-facing surface of each of the first and second substrates.

Preferably a tie layer is applied to a substrate or barrier film surface by spin-coating techniques. However, other known solution techniques can be used to form a tie layer.

In certain embodiments, an adhesion promoter does not include an epoxy-containing material or other epoxy functionality.

The quantum dot composition can further comprise one or more additional components, including, for example, but not limited to, one or more of scatterers, a thixotrope, and an emission stabilizer, as provided above.

In certain embodiments, the additional components do not include an epoxy-containing material or other epoxy functionality.

In certain embodiments, the quantum dot composition does not include an epoxy-containing material or other epoxy functionality.

In certain embodiments, the quantum dot-containing layer can be sealed between the first and second substrates.

Preferably, at least one of the first substrate and second substrate comprises a barrier film. In certain preferred embodiments, both substrates comprise a barrier film.

Substrates and barrier films are discussed in more detail above.

Optionally, an optical film can include additional layers.

An optical film can further optionally include one or more light diffusion layers disposed between the quantum dot-containing layer and the light-emitting surface of the optical film.

Examples of light diffusion layers are described above.

In accordance with yet another aspect of the present invention, there is provided an optical component including a quantum dot composition including quantum dots dispersed in a polymer matrix, the quantum dot composition being prepared from a pre-polymer formulation comprising quantum dots and a cyclohexylacrylate monomer, the quantum dot composition being sealed within an optically transparent member.

In certain preferred embodiments, a quantum dot composition is prepared from a pre-polymer formulation including quantum dots and a cyclohexylacrylate monomer described herein.

The quantum dot composition included in the optical component can comprise a quantum dot composition including quantum dots dispersed in a polymer matrix, the quantum dot composition being prepared from a pre-polymer formulation comprising quantum dots and a cyclohexylacrylate monomer in accordance with an aspect of the present invention, described herein.

As provided above, the pre-polymer formulation comprising quantum dots and a cyclohexylacrylate monomer from which such quantum dot composition is prepared preferably further includes and adhesion promoter which becomes cross-linked into the resulting cyclohexylacrylate-based polymer matrix of the quantum dot composition.

In certain embodiments, an adhesion promoter does not include an epoxy-containing material or other epoxy functionality.

The quantum dot composition can further comprise one or more additional components, including, for example, but not limited to, one or more of scatterers, a thixotrope, and an emission stabilizer, as provided above.

In certain embodiments, the additional components do not include an epoxy-containing material or other epoxy functionality.

In certain embodiments, the quantum dot composition does not include an epoxy-containing material or other epoxy functionality.

An optically transparent member is preferably used to permit light to pass into and/or out of the quantum dot composition contained therein.

An optically transparent member can have a variety of different shapes or configurations. The member preferably includes a sealable hollow or cavity portion in which the quantum dot composition is disposed. Examples include a hollow tubular-like member or hollow bar-like member constructed from an optically transparent material. A preferred material of construction for such member is glass.

For example, the quantum dot composition can be included in a hollow or cavity portion of a tubular-like structural member (e.g., a tube, hollow capillary, hollow fiber, etc.) that can be open at either or both ends. Preferably open end(s) of the member are hermetically sealed after the composition is included therein. Examples of sealing techniques include but are not limited to, (1) contacting an open end of a tube with an epoxy, (2) drawing the epoxy into the open end due to shrinkage action of a curing resin, or (3) covering the open end with a glass adhering metal such as a glass adhering solder or other glass adhering material, (4) hot glue; and (5) melting the open end by heating the glass above the melting point of the glass and pinching the walls together to close the opening to form a molten glass hermetic seal.

Other suitable sealing techniques can be used for sealing the quantum dot composition in the optically transparent member, dependent upon the size and shape of the member.

The configuration and dimensions of an optical component can be selected based on the intended end-use application and design.

In accordance with another aspect of the present invention, there is provided a pre-polymer formulation comprising quantum dots and a precursor for a polymer having a free volume parameter $V_{FH2}/\gamma$ with a value less than or equal to 0.03 cm$^3$/g.

Examples of precursors for a polymer having a free volume parameter $V_{FH2}/\gamma$ with a value less than or equal to 0.03 cm$^3$/g include, for example, but are not limited to, a cyclohexylacrylate monomer, a butylacrylate monomer, a butylmethacrylate monomer, an ethylmethacrylate monomer, an ethylhexylmethacrylate monomer, an n-hexylmethacrylate monomer, an isobutylacrylate monomer, or an n-octylmethacrylate monomer.

In certain preferred embodiments, a precursor for a polymer having a free volume parameter $V_{FH2}/\gamma$ with a value less than or equal to 0.03 cm$^3$/g comprises a cyclohexylacrylate monomer. A precursor for a cyclohexylacrylate polymer includes a cyclohexylacrylate monomer.

Quantum dots included in a pre-polymer formulation are preferably selected based on the desired peak emission wavelength or combinations of wavelengths desired for the particular intend end-use application for the pre-polymer formulation.

The total amount of quantum dots included in a pre-polymer formulation within the scope of the invention is preferably in a range from about 0.01 to about 25 weight percent, and any weight percent in between. For example, an amount in a range from about 0.05 weight percent to about 15 weight percent, or about 0.05 weight percent to about 5 weight percent can be desirable for various applications. Such amounts are not intended to be limiting. An amount outside of such ranges may also be determined to be useful. The amount of quantum dots included in a quantum dot pre-polymer formulation can vary based on the particular end application.

Quantum dots are discussed in more detail below.

The pre-polymer formulation can further comprise one or more additional components, including, for example, but not limited to, one or more of an adhesion promoter, a photoinitiator, scatterers, a thixotrope, an emission stabilizer, and a cross-linking agent.

In certain embodiments, the additional components do not include an epoxy-containing material or other epoxy functionality.

In certain embodiments, the pre-polymer formulation does not include an epoxy-containing material or other epoxy functionality.

An adhesion promoter can be included in the pre-polymer formulation, for example, in an amount in the range from about 0.01 weight percent to about 10 weight percent of the formulation. Other amount outside such range may also useful. Nonlimiting exemplary amounts include 2.5 weight percent and 5 weight percent.

An adhesion promoter can comprise a single adhesion promoter or a mixture of two or more different adhesion promoters.

An adhesion promoter can be preferably included in a pre-polymer formulation for use in applications in which adhesion of the cured formulation to a surface is desired.

A preferred example of an adhesion promoter includes, but is not limited to, UV light curable acrylic-based optically clear adhesives, such as LOCTITE 3195, available from Henkel Corporation.

Other examples of adhesion promoters include UV light curable acrylic-based optically clear adhesives with properties similar to LOCTITE 3195; GELEST PRIMER A1, available from Gelest, Inc., Morrisville, Pa. USA; bis[2-(methyloyloxy)ethyl]phosphate (BMEP) available from Sigma Aldrich, Saint Louis, Mo. USA; PL-2110 available from ESSTECH, Inc., Essington, Pa. USA, (a methacrylate monomer base structure including a phosphate functionality); PL-2212 available from ESSTECH, Inc., Essington, Pa. USA (an acrylate monomer base structure including a carboxylate functionality); and N-methyl-aza-2,2,4-trimethyl-silacyclopentane (cyclic silazane).

Optionally, an adhesion promoter comprises a mixture of two or more adhesion promoters. A non-limiting example of a mixture of adhesion promoters includes, but is not limited to, a mixture of a UV light curable acrylic-based optically clear adhesive, such as LOCTITE 3195, and one or more of GELEST PRIMER A1, bis[2-(methyloyloxy)ethyl]phosphate (BMEP), PL-2110, PL-2212, and N-methyl-aza-2,2,4-trimethylsilacyclopentane (cyclic silazane). A non-limiting example of such mixture of adhesion promoters can include a first adhesion promoter, e.g., UV light curable acrylic-based optically clear adhesive, such as LOCTITE 3195, in an amount of 5 weight percent based on the pre-polymer formulation weight and from 0.05 to 0.5 weight percent each of any one or more of other adhesion promoters included in the mixture.

Scatterers, within the scope of the disclosure may be included, for example, in an amount from about 0.01 weight percent to about 15 weight percent of the pre-polymer formulation. Amounts of scatterers outside such range may also be useful. Nonlimiting exemplary amounts include amounts in a an amount from about 0.01 weight percent to about 2 weight percent, or about 0.1 weight percent to about 1 weight percent. Examples of scatterers that can be used in the embodiments and aspects of the inventions described herein, include, without limitation, metal or metal oxide particles, air bubbles, and glass and polymeric beads (solid or hollow). Other scatterers can be readily identified by those of ordinary skill in the art in certain embodiments, scatterers have a spherical shape. Preferred examples of scattering particles include, but are not limited to, $TiO_2$, $SiO_2$, $BaTiO_3$, $BaSO_4$, and ZnO. Particles of other materials that are non-reactive with the host material and that can increase the absorption path length of the excitation light in the host material can be used. In certain embodiments, light scatterers may have a high index of refraction (e.g., $TiO_2$, $BaSO_4$, etc.) or a low index of refraction (gas bubbles). Scatterers are preferably non-luminescent.

Scatterers can comprise a single type of scatterer or a mixture of two or more different types of scatterers.

Selection of the size and size distribution of the scatterers is readily determinable by those of ordinary skill in the relevant art. The size and size distribution can be based upon the refractive index mismatch of the scattering particle and the cyclohexyl acrylate monomer or other polymer precursor in which the scatterers are to be dispersed, and the preselected wavelength(s) to be scattered according to light scattering theory, e.g., Rayleigh or Mie scattering theory. The surface of the scattering particle may further be treated to improve dispersability and stability in the host material. In one embodiment, the scattering particle comprises $TiO_2$ (R902+ from DuPont) having a 0.405 μm median particle size and are included in a pre-polymer formulation in a concentration in a range from about 0.01 to about 1% by weight.

The amount of the scatterers may be altered relative to the amount of quantum dots used in the formulation. For example, when the amount of the scatter is increased, the amount of quantum dots may be decreased.

A pre-polymer formulation of the present invention can further include a thixotrope.

A thixotrope can comprise a single thixotrope or a mixture of two or more thixotropes.

Examples of thixotropes (which may also referred to as rheology or viscosity modifiers) which may be included in a pre-polymer formulation include, but are not limited to, fumed metal oxides (e.g., fumed silica which can be surface treated or untreated (such as CAB-O-SL™ fumed silica products available from Cabot Corporation, including, but not limited to, CAB-O-SIL TS720 and CAB-O-SIL TS610), or fumed metal oxide gels (e.g., a silica gel). A pre-polymer formulation can include an amount of thixotrope in an amount greater than zero up to about 15 weight percent of the pre-polymer formulation. For example, a thixotrope can be included in the formulation in an amount in a range from about 5 to about 12 weight percent of the formulation. Other amounts outside the range may also be determined to be useful.

A pre-polymer formulation of the present invention can further include a photoinitiator.

A photoinitiator can comprise a single photoinitiator or a mixture of two or more photoinitiators.

Nonlimiting examples of photoinitiators include IRGACURE 2022, KTO-46 (Lambert), Esacure 1 (Lambert) and the like.

Photoinitiators can be included in the polymerizable formulation in an amount from about 0.01% to about 10% weight percent of the pre-polymer formulation. For example, a photoinitiator can be included in the formulation in an amount in a range from about 1 to about 5 weight percent of the formulation. Other amounts outside the above ranges may also be determined to be useful.

Photoinitiators generally help to sensitize the polymerizable composition to UV light for photopolymerization.

A pre-polymer formulation can further include an emission stabilizer. Emission stabilizers, examples of emission stabilizers, and other information concerning the use of emission stabilizers are described in International Application No. PCT/US2012/066151, entitled "Quantum Dot-Containing Compositions Including an Emission Stabilizer, Products Including Same, And Method" of QD Vision, Inc., filed 20 Nov. 2012, which published as WO 2013/078252 on 30 May 2013, which is hereby incorporated herein by reference in its entirety.

An emission stabilizer can be included in the pre-polymer formulation in an amount greater than 0 up to about 10 weight percent of the formulation. Other amounts outside this range may also be determined to be useful.

In many embodiments, an emission stabilizer preferably includes at least one of potassium dodecyl phosphate and trioctyl phosphine oxide.

A pre-polymer formulation can further include a cross-linking agent A cross-linking agent can comprise a single cross-linking agent or a mixture of two or more cross-linking agents.

Nonlimiting examples of cross-linking agents include ethylene glycol dimethacrylate EBECRYL 150 and the like.

Crosslinking agents can be included in the pre-polymer formulation in an amount from about 0.5 to about 30.0 weight percent of the pre-polymer formulation. For example, crosslinking agents can be included in the pre-polymer formulation in an amount from about 0.5 to about 3.0 weight percent or about 0.5 to about 3.0 weight percent of the formulation. Crosslinking agents are generally added, for example in an amount of about 1% weight percent to improve stability and strength of a polymer which helps avoid cracking of the polymer due to shrinkage upon curing of the polymer.

A pre-polymer formulation may include no cross-linking agent.

In accordance with a further aspect of the present invention, there is provided a quantum dot composition including quantum dots dispersed in a polymer matrix, the quantum dot composition being prepared from a pre-polymer formulation comprising quantum dots and a precursor for a polymer having a free volume parameter $V_{FH2}/\gamma$ with a value less than or equal to 0.03 cm³/g.

In certain preferred embodiments, a quantum dot composition is prepared from a pre-polymer formulation described herein.

Examples of precursors for a polymer having a free volume parameter $V_{FH2}/\gamma$ with a value less than or equal to 0.03 cm³/g include, for example, but are not limited to, a cyclohexylacrylate monomer, a butylacrylate monomer, a butylmethacrylate monomer, an ethylmethacrylate monomer, an ethylhexylmethacrylate monomer, an n-hexylmethacrylate monomer, an isobutylacrylate monomer, or an n-octylmethacrylate monomer.

In certain preferred embodiments, a precursor for a polymer having a free volume parameter $V_{FH2}/\gamma$ with a value less than or equal to 0.03 cm³/g comprises a cyclohexylacrylate monomer. A precursor for a cyclohexylacrylate polymer includes a cyclohexylacrylate monomer.

Quantum dots included in a quantum dot composition are preferably selected based on the desired peak emission wavelength or combinations of wavelengths desired for the particular intend end-use application for the quantum dot composition.

In an embodiment, the composition includes quantum dots in an amount greater than 0 up to about 25 weight percent of the composition. The total amount of quantum dots included in a quantum dot composition within the scope of the invention is preferably in a range from about 0.01 to about 25 weight percent, and any weight percent in between. For example, an amount in a range from about 0.05 weight percent to about 15 weight percent, or about 0.05 weight percent to about 5 weight percent can be desirable for various applications. Such amounts are not intended to be limiting. An amount outside of such ranges may also be determined to be useful. The amount of quantum dots included in a quantum dot composition can vary based on the particular end application.

Quantum dots are discussed in more detail below.

The pre-polymer formulation preferably further includes and adhesion promoter that becomes cross-linked into the polymer matrix of the quantum dot composition. Such adhesive promoter can be incorporated into the polymer in an amount up to about 10 weight percent of the quantum dot composition. Other amount outside such range may also useful.

An adhesion promoter can comprise a single adhesion promoter or a mixture of two or more different adhesion promoters.

An adhesion promoter can be preferably included in a quantum dot composition for use in applications in which adhesion of the cured composition to a surface is desired.

A preferred example of an adhesion promoter includes, but is not limited to, UV light curable acrylic-based optically clear adhesives, such as LOCTITE 3195, available from Henkel Corporation.

Other examples of adhesion promoters include UV light curable acrylic-based optically clear adhesives with properties similar to LOCTITE 3195; GELEST PRIMER A1, available from Gelest, Inc., Morrisville, Pa. USA; bis[2-(methyloyloxy)ethyl]phosphate (BMEP) available from Sigma Aldrich, Saint Louis, Mo. USA; PL-2110 available from ESSTECH, Inc., Essington, Pa. USA, (a methacrylate monomer base structure including a phosphate functionality); PL-2212 available from ESSTECH, Inc., Essington, Pa. USA (an acrylate monomer base structure including a carboxylate functionality), and N-methyl-aza-2,2,4-trimethylsilacyclopentane (cyclic silazane).

Optionally, an adhesion promoter comprises a mixture of two or more adhesion promoters. A non-limiting example of a mixture of adhesion promoters includes, but is not limited to, a mixture of a UV light curable acrylic-based optically clear adhesive, such as LOCTITE 3195, and one or more of GELEST PRIMER A1, bis[2-(methyloyloxy)ethyl]phosphate (BMEP), PL-2110, PL-2212, and N-methyl-aza-2,2,4-trimethylsilacyclopentane (cyclic silazane). A non-limiting example of such mixture of adhesion promoters can include a first adhesion promoter, e.g., UV light curable acrylic-based optically clear adhesive, such as LOCTITE 3195, in an amount of 5 weight percent based on the pre-polymer formulation weight and from 0.05 to 0.5 weight percent each of any one or more of other adhesion promoters included in the mixture.

In certain embodiments, an adhesion promoter does not include an epoxy-containing material or other epoxy functionality.

A quantum dot composition can further comprise one or more additional components, including, for example, but not limited to, one or more of scatterers, a thixotrope, and an emission stabilizer.

In certain embodiments, the additional components do not include an epoxy-containing material or other epoxy functionality.

Scatterers, within the scope of the disclosure may be included, for example, in an amount from about 0.01 weight percent to about 15 weight percent. Amounts of scatterers outside such range may also be useful. Nonlimiting exemplary amounts include amounts in a an amount from about 0.01 weight percent to about 2 weight percent, or about 0.1 weight percent to about 1 weight percent. Examples of scatterers that can be used in the embodiments and aspects of the inventions described herein, include, without limitation, metal or metal oxide particles, air bubbles, and glass and polymeric beads (solid or hollow). Other scatterers can be readily identified by those of ordinary skill in the art. In certain embodiments, scatterers have a spherical shape Preferred examples of scattering particles include, but are not limited to, $TiO_2$, $SiO_2$, $BaTiO_3$, $BaSO_4$, and ZnO. Particles of other materials that are non-reactive with the host material and that can increase the absorption pathlength of the excitation light in the host material can be used. In certain embodiments, light scatterers may have a high index of refraction (e.g., $TiO_2$, $BaSO_4$, etc.) or a low index of refraction (gas bubbles). Scatterers are preferably non-luminescent.

Scatterers can comprise a single type of scatterer or a mixture of two or more different types of scatterers.

Selection of the size and size distribution of the scatterers is readily determinable by those of ordinary skill in the relevant art. The size and size distribution can be based upon the refractive index mismatch of the scattering particle and the cyclohexyl acrylate monomer or other polymer precursor in which the scatterers are to be dispersed, and the preselected wavelength(s) to be scattered according to light scattering theory, e.g., Rayleigh or Mie scattering theory. The surface of the scattering particle may further be treated to improve dispersability and stability in the host material. In one embodiment, the scattering particle comprises $TiO_2$ (R902+ from DuPont) having a 0.405 μm median particle size and are included in a quantum dot composition in a concentration in a range from about 0.01 to about 1% by weight.

The amount of the scatterers may be altered relative to the amount of quantum dots used in the composition. For example, when the amount of the scatter is increased, the amount of quantum dots may be decreased.

A quantum dot composition of the present invention can further include a thixotrope.

A thixotrope can comprise a single thixotrope material or a mixture of two or more thixotrope materials.

Examples of thixotropes (which may also be referred to as rheology or viscosity modifiers) which may be included in a quantum dot composition include, but are not limited to, fumed metal oxides (e.g., fumed silica which can be surface treated or untreated (such as CAB-O-SIL™ fumed silica products available from Cabot Corporation, including, but not limited to, CAB-O-SIL TS720 and CAB-O-SIL TS610), or fumed metal oxide gels (e.g., a silica gel). A quantum dot composition can include an amount of thixotrope in an amount greater than zero up to about 15 weight percent of the quantum dot composition. For example, a thixotrope can be included in the composition in an amount in a range from about 5 to about 12 weight percent of the formulation. Other amounts outside the range may also be determined to be useful.

A quantum dot composition can further include an emission stabilizer. Emission stabilizers, examples of emission stabilizers, and other information concerning the use of emission stabilizers are described in International Application No. PCT/US2012/066151, entitled "Quantum Dot-Containing Compositions Including an Emission Stabilizer, Products Including Same, And Method" of QD Vision, Inc., filed 20 Nov. 2012, which published as WO 2013/078252 on 30 May 2013, which is hereby incorporated herein by reference in its entirety.

An emission stabilizer can be included in the quantum dot composition in an amount greater than 0 up to about 10 weight percent of the composition Other amounts outside this range may also be determined to be useful.

In many embodiments, an emission stabilizer preferably includes at least one of potassium dodecyl phosphate and trioctyl phosphine oxide.

In certain embodiments, the quantum dot composition does not include an epoxy-containing material or other epoxy functionality.

In accordance with a further aspect of the present invention, there is provided an optical film comprising: a first substrate, a second substrate, and a quantum dot-containing layer disposed between the first and second substrates, the quantum dot-containing layer including a quantum dot composition including quantum dots dispersed in a polymer matrix, the quantum dot composition being prepared from a pre-polymer formulation comprising quantum dots and a precursor for a polymer having a free volume parameter $V_{FH2}/\gamma$ with a value less than or equal to 0.03 cm³/g.

FIG. 8 depicts a cross-sectional side view of an example of an embodiment of an optical film in accordance with the present invention. As shown, the optical film 1 includes a quantum dot-containing layer 20 disposed between a first substrate 10 and a second substrate 30. The first substrate and the second substrate can be the same or different.

A quantum dot-containing layer can comprise a quantum dot composition in accordance with the present invention.

In certain preferred embodiments, a quantum dot composition is prepared from a pre-polymer formulation described herein Examples of precursors for a polymer having a free volume parameter $V_{FH2}/\gamma$ with a value less than or equal to 0.03 cm³/g include, for example, but are not limited to, a cyclohexylacrylate monomer, a butylacrylate monomer, a butylmethacrylate monomer, an ethylmethacrylate monomer, an ethylhexylmethacrylate monomer, an n-hexylmethacrylate monomer, an isobutylacrylate monomer, or an n-octylmethacrylate monomer.

In certain preferred embodiments, a precursor for a polymer having a free volume parameter $V_{FH2}/\gamma$ with a value less than or equal to 0.03 cm³/g comprises a cyclohexylacrylate monomer.

In certain preferred embodiments, a polymer matrix comprises a cyclohexylacrylate-based polymer.

As provided above, the pre-polymer formulation preferably further includes and adhesion promoter that becomes cross-linked into the polymer matrix of the quantum dot composition.

While a quantum dot composition including a polymer matrix having a free volume parameter $V_{FH2}/\gamma$ with a value less than or equal to 0.03 cm$^3$/g is desirable, the scope of the present invention also includes a quantum dot composition which is prepared from a pre-polymer formulation comprising quantum dots and a precursor for a polymer having a free volume parameter $V_{FH2}/\gamma$ with a value less than or equal to 0.03 cm$^3$/g, as taught herein, that further includes one or more additional components (e.g., but not limited to, an adhesion promoter) that become cross-linked or otherwise incorporated into the resulting polymer matrix or quantum dot composition and provide a polymer matrix having a free volume parameter greater than 0.03 cm$^3$/g.

In certain embodiments, an adhesion promoter does not include an epoxy-containing material or other epoxy functionality.

The quantum dot composition can further comprise one or more additional components, including, for example, one or more of scatterers, a thixotrope, and an emission stabilizer, as provided above.

In certain embodiments, the additional components do not include an epoxy-containing material or other epoxy functionality.

In certain embodiments, the quantum dot composition does not include an epoxy-containing material or other epoxy functionality.

In certain embodiments, the quantum dot-containing layer can be sealed between the first and second substrates.

Preferably, at least one of the first substrate and second substrate comprises a barrier film. In certain preferred embodiments, both substrates comprise a barrier film.

Substrates and barrier films are discussed in more detail above.

Optionally, an optical film can include additional layers.

An optical film can further optionally include one or more light diffusion layers disposed between the quantum dot-containing layer and the light-emitting surface of the optical film.

Examples of light diffusion layers are described above.

In accordance with a yet another aspect of the present invention, there is provided an optical film comprising a first substrate, a second substrate, and a quantum dot-containing layer disposed between the first substrate and the second substrate, and at least one tie layer comprising an adhesion promoter disposed between the quantum dot-containing layer and at least one of the first and second substrates, the quantum dot-containing layer including a quantum dot composition including quantum dots dispersed in a polymer matrix, the quantum dot composition being prepared from a pre-polymer formulation comprising quantum dots and a precursor for a polymer having a free volume parameter $V_{FH2}/\gamma$ with a value less than or equal to 0.03 cm$^3$/g.

FIG. 8 depicts a cross-sectional side view of an example of an embodiment of an optical film in accordance with the present invention. As shown, the optical film 1 includes a quantum dot-containing layer 20 disposed between a first substrate 10 and a second substrate 30 The first substrate and the second substrate can be the same or different. (A tie layer is not shown in the optical film example depicted in the figure.)

A quantum dot-containing layer can comprise a quantum dot composition in accordance with the present invention.

In certain preferred embodiments, a quantum dot composition is prepared from a pre-polymer formulation described herein.

Examples of precursors for a polymer having a free volume parameter $V_{FH2}/\gamma$ with a value less than or equal to 0.03 cm$^3$/g include, for example, but are not limited to, a cyclohexylacrylate monomer, a butylacrylate monomer, a butylmethacrylate monomer, an ethylmethacrylate monomer, an ethylhexylmethacrylate monomer, an n-hexylmethacrylate monomer, an isobutylacrylate monomer, or an n-octylmethacrylate monomer.

In certain preferred embodiments, a precursor for a polymer having a free volume parameter $V_{FH2}/\gamma$ with a value less than or equal to 0.03 comprises a cyclohexylacrylate monomer.

In certain preferred embodiments, a polymer matrix comprises a cyclohexylacrylate-based polymer.

As provided above, the pre-polymer formulation preferably further includes and adhesion promoter that becomes cross-linked into the polymer matrix of the quantum dot composition.

As discussed above, a tie layer can be a layer or coating comprising an adhesion promoter.

An adhesion promoter included in a tie layer can comprise an adhesion promoter described herein. As also discussed herein, an adhesion promoter can comprise a mixture of two or more adhesion promoters.

A tie layer comprising an adhesion promoter is preferably disposed between the quantum dot-containing layer and the inner-facing surface of at least one of the substrates as a surface treatment coating on the inner-facing surface of one or both of the substrates. In certain preferred embodiments, a tie layer comprising an adhesion promoter is preferably disposed between the quantum dot-containing layer and the inner-facing surfaces both of the substrate as a surface treatment coating on the inner-facing surface of each of the first and second substrates.

Preferably a tie layer is applied to a substrate or barrier surface by spin-coating techniques. However, other known solution techniques can be used to form a tie layer.

In certain embodiments, an adhesion promoter does not include an epoxy-containing material or other epoxy functionality.

The quantum dot composition can further comprise one or more additional components, including, for example, one or more of scatterers, a thixotrope, and an emission stabilizer, as provided above.

In certain embodiments, the additional components do not include an epoxy-containing material or other epoxy functionality.

In certain embodiments, the quantum dot composition does not include an epoxy-containing material or other epoxy functionality.

In certain embodiments, the quantum dot-containing layer can be sealed between the first and second substrates.

Preferably, at least one of the first substrate and second substrate comprises a barrier film. In certain preferred embodiments, both substrates comprise a barrier film.

Substrates and barrier films are discussed in more detail above.

Optionally, an optical film can include additional layers.

An optical film can further optionally include one or more light diffusion layers disposed between the quantum dot-containing layer and the light-emitting surface of the optical film.

Examples of light diffusion layers are described above.

In accordance with yet another aspect of the present invention, there is provided an optical component including quantum dots dispersed in a polymer matrix, the quantum dot composition being prepared from a pre-polymer formulation comprising quantum dots and a precursor for polymer having a free volume parameter $V_{FH2}/\gamma$ with a value less than or equal to 0.03 cm$^3$/g, the quantum dot composition being sealed within an optically transparent member.

A quantum dot-containing layer can comprise a quantum dot composition in accordance with the present invention.

In certain preferred embodiments, a quantum dot composition is prepared from a pre-polymer formulation described herein.

Examples of precursors for a polymer having a free volume parameter $V_{FH2}/\gamma$ with a value less than or equal to 0.03 cm$^3$/g include, for example, but are not limited to, a cyclohexylacrylate monomer, a butylacrylate monomer, a butylmethacrylate monomer, an ethylmethacrylate monomer, an ethylhexylmethacrylate monomer, an n-hexylmethacrylate monomer, an isobutylacrylate monomer, or an n-octylmethacrylate monomer.

In certain preferred embodiments, a polymer matrix comprises a cyclohexylacrylate-based polymer.

As provided above, the pre-polymer formulation preferably further includes and adhesion promoter that becomes cross-linked into the polymer matrix of the quantum dot composition.

In certain embodiments, an adhesion promoter does not include an epoxy-containing material or other epoxy functionality.

The quantum dot composition can further comprise one or more additional components, including, for example, one or more of scatterers, a thixotrope, and an emission stabilizer, as provided above.

In certain embodiments, the additional components do not include an epoxy-containing material or other epoxy functionality.

In certain embodiments, the quantum dot composition does not include an epoxy-containing material or other epoxy functionality.

An optically transparent member is used to permit light to pass into and/or out of the quantum dot composition contained therein.

The configuration and dimensions of an optical component can be selected based on the intended end-use application and design.

An optically transparent member can have a variety of different shapes or configurations. The member preferably includes a sealable hollow or cavity portion in which the quantum dot composition is disposed. Examples include a hollow tubular-like member or hollow bar-like member constructed from an optically transparent material. A preferred material of construction for such member is glass.

For example, the quantum dot composition can be included in a hollow or cavity portion of a tubular-like structural member (e.g., a tube, hollow capillary, hollow fiber, etc.) that can be open at either or both ends. Preferably open end(s) of the member are hermetically sealed after the composition is included therein. Examples of sealing techniques include but are not limited to, (1) contacting an open end of a tube with an epoxy, (2) drawing the epoxy into the open end due to shrinkage action of a curing resin, or (3) covering the open end with a glass adhering metal such as a glass adhering solder or other glass adhering material, (4) hot glue; and (5) melting the open end by heating the glass above the melting point of the glass and pinching the walls together to close the opening to form a molten glass hermetic seal.

Other suitable sealing techniques can be used for sealing the quantum dot composition in the optically transparent member, dependent upon the size and shape of the member.

In accordance with yet another aspect of the present invention, there is provided a method for curing a pre-polymer formulation comprising quantum dots and a cyclohexylacrylate monomer, the method comprising exposing the pre-polymer to UV radiation for more than 30 seconds.

In accordance with yet further aspect of the present invention, there are provided displays and backlight units including a quantum dot composition described herein, displays and backlight units including an optical film described herein, and displays and backlight units including an optical component described herein.

The present invention will be further clarified by the following examples, which are intended to be exemplary of the present invention.

EXAMPLES Example 1 Preparation of Semiconductor Nanocrystals Capable of Emitting Green Light Synthesis of 475 nm CdSe Cores (ggCdSeC-424).

The following are added to an open-top 1 L steel reaction vessel: Cd(Oleate)$_2$ (100.97 g, 1.0 M in TOP), trioctylphosphine oxide (TOPO, 53.2 g), 1-octadecylphosphonic acid (ODPA, 33.9 g) and 1-octadecene (ODE, 219 g). The vessel is subjected to 3 cycles of vacuum/nitrogen at 120° C., and the temperature is raised to 270° C. under nitrogen. At 270° C., a solution of 1.0 M diisobutylphosphine selenide in N-dodecylpyrrolidone (DIBP-Se, 75.2 g) is rapidly injected, within a period of less than 1 second, followed immediately by injection of ODE (82.5 mL between two syringes) to rapidly drop the temperature to about 224° C. resulting in the production of quantum dots with an initial absorbance peak between 420-430 nm Immediately after the ODE injection, a solution of Cd(Oleate)$_2$ (237.7 g, 1.0 M in TOP) mixed with ODE (188.5 g) and split into three syringes is continuously introduced along with a solution of DIBP-Se (181.5 g, 1.0 M in NDP) mixed with ODE (226.2 g) and split in to three syringes at a rate of 7.46 mL/min. A total of 49.4 mL of each syringe of precursor is delivered while the temperature of the reactor was maintained between 205-240° C. Energy supply for the mantle is cut at 42 mL infused and mantle removed at 45 mL infused. As the infusion finishes, the reaction vessel is cooled rapidly by immersing the reactor in a squalane bath chilled with liquid nitrogen to rapidly bring the temperature down to <120° C. The final material is used as is without further purification.

(Exemplary Properties First absorbance peak: 475 nm, 15 nm HWHM, Total mass 694.3 g, Reaction yield: 89%).

Synthesis of CdSe/ZnS/CdZnS Core/Shell/Shell (ggCdSeCS-521):

The CdSe core synthesized from above, with a first absorbance peak of 475 nm (39.07 mL, 6.41 mmol Cd), is mixed with dodecanethiol (15.98 g) in a syringe. All Zn(Oleate) precursors (0.5 M in trioctylphosphine) are doped with 0.85% acetic acid by weight A reaction flask containing Zn(Oleate)$_2$ (98.8 g, 0.5 M in TOP) is heated to 320° C., upon which the syringe containing cores and 1-dodecanethiol is swiftly injected. When the temperature recovers to 300° C. (between 2-8 min), the precursors are delivered via a syringe pump over a period of 40 min. The two precursor stocks consist of the following: 1) Zn(Oleate) (198.68 g, 0.5 M in TOP) mixed with Cd(Oleate)$_2$ (73.26 g, 1.0 M in TOP), and 2) dodecanethiol (33.53 g). During the infusion, the temperature is maintained between 320-330°

C. Any volatiles from the system are allowed to distill over and leave the system in order for the temperature to reach 320-330° C. After the infusion ended, the sample is annealed for 6 min at 320-330° C. and cooled to room temperature over a period of 5-15 min. The final core/shell material is precipitated via the addition of butanol and methanol at a 2:1 ratio v/v. The pellet is isolated via centrifugation, and redispersed into toluene for storage.

(Exemplary Properties: Emission 541 nm+/−2 nm, FWHM 29 nm, Film EQE at RT: 102%, Film EQE at 140 C: >95%).

Example 2 Preparation of Semiconductor Nanocrystals Capable of Emitting Red Light Synthesis of 579 nm CdSe Cores (ggCdSeC-247).

The following are added to an open-top 1 L steel reaction vessel: trioctylphosphine oxide (TOPO, 13.11 g), 1-octadecylphosphonic acid (ODPA, 1.6 g) and 1-octadecene (ODE, 191.97 g). The vessel is degassed at 100° C. until the ODE begins to reflux, backfilled with nitrogen, and the temperature is raised to 270° C. under nitrogen. At 270° C. two solutions, the first containing diisobutylphosphine selenide in trioctylphosphine (DIBP-Se, 3.34 g, 1.0 M in TOP) mixed with ODE (8.83 g) and the second containing $Cd(Oleate)_2$ (4.76 g, 1.0 M in TOP) mixed with ODE (11.32 g), are rapidly injected, within a period of less than 1 second, followed immediately by injection of ODE (102.86 mL) to rapidly drop the temperature to about 205° C. resulting in the production of quantum dots with an initial absorbance peak between 420-430 nm. Immediately after the ODE injection, the temperature is reset to 240° C. and a solution of $Cd(Oleate)_2$ (90.02 g, 1.0 M in TOP) mixed with ODE (71.38 g) and split into three syringes is continuously introduced along with a solution of DIBP-Se (72.84 g, 1.0 M in TOP) mixed with ODE (78.52 g) and split in to three syringes at a rate of 15.8 mL/min while the temperature of the reactor is maintained between 235-245° C. At 15, 25, 35 and 45 min the rate of addition is increased to 31.6, 47.3, 63.1, and 84.2 mL/min respectively. A total of 45 mL (57 min 13 sec) of each syringe of precursor is delivered. As the infusion finishes, the reaction vessel is cooled rapidly by immersing the reactor in a squalane bath chilled with liquid nitrogen to rapidly bring the temperature down to <120° C. The final material is used as is without further purification.

(Exemplary Properties: First absorbance peak: 579 nm, 12 nm HWHM, Total mass: 550.40 g, Reaction yield: 63.76 mmol Cd).

Synthesis of CdSe/ZnS/CdZnS Core/Shell/Shell (grCdSeCS-740):

The reaction vessel is assembled and undergoes 3 vacuum/nitrogen cycles. Following the cycles a mixture of the CdSe core synthesized from above, with a first absorbance peak of 579 nm (744.02 g, 90 mmol Cd), $Zn(Oleate)_2$ (248.45 g) and 1-octadecene (ODE, 679.54 g) are added air-free via cannula transfer. The material is degassed at 110° C. and backfilled with nitrogen. The reaction vessel is then heated to 320° C., upon which the syringe containing dodecanethiol (DDT, 209.65 g) is swiftly injected. At 1 min 30 sec the precursors are delivered via slow addition over a period of 15 min. The two precursor stocks include the following: 1) Zn(Oleate). (236.55 g, 0.5 M in TOP) mixed with $Cd(Oleate)_2$ (741.36 g, 1.0 M in TOP), and 2) dodecanethiol (266.99 g). During the infusion, the temperature is maintained between 320-330' C. Any volatiles from the system are allowed to distill over and leave the system in order for the temperature to reach 320-330° C. After the infusion ended, the sample is annealed for 18 min at 320-330° C. and cooled to room temperature over a period of 5-15 min. The final core/shell material is precipitated via the addition of butanol and methanol at a 2:1 ratio v/v. The pellet is isolated via centrifugation, and redispersed into toluene for storage.

(Exemplary Properties: Emission 628 nm+/−2 nm, FWHM 27 nm, Film EQE at RT: 94).

Example 3 Transfer of Green Quantum Dots from Solvent to Monomer Solution 100 mL of a quantum dot solution in toluene (prepared substantially as described in Example 1 and with properties substantially as those described for the Green-emitting core/shell/shell CdSe/ZnS/CdZnS quantum dots so prepared) was evenly divided into 8 centrifuge tubes in an inert atmosphere box. 14.6 mL of n-butanol and 10.4 mL of methanol (both anhydrous and oxygen free) were then sequentially added sequentially to the tube. The centrifuge tubes were then capped and vortexed on a vortex genie for 20 seconds. The tubes were then placed in a centrifuge and spun at 4000 rpm for 2 minutes.

The tubes were opened in the inert gas box and the centrate was poured off of the tubes. The tubes were inverted on a paper wiper for 2 minutes to allow any remaining centrate to drain from the tubes.

To each tube was added 10 mL of lauryl methacrylate (LMA) monomer. The QD containing centrifuge pellet in each tube was broken up with a blunt needle attached to a syringe barrel. The tubes were then capped and vortexed until the quantum dot pellet was redispersed. The quantum dot/monomer solutions from each centrifuge tube were then transferred to a central collection container. The empty centrifuge tubes were then rinsed with 1-2 mL of lauryl methacrylate and the rinses combined into the central collection container. The central collection container was capped and wrapped with tape as a seal.

A small aliquot of the solution was removed to determine the concentration of quantum dots by visible light absorption at 450 nm using a UV-Vis spectrophotometer. Emission peak wavelength of the solutions and full width half maximum of the emission lines was determined using a spectrofluorimeter.

Example 4 Transfer of Red Quantum Dots from Solvent to Monomer Solution 100 mL of a quantum dot solution in toluene (prepared substantially as described in Example 2 and with properties substantially as those described for the Red-emitting core/shell/shell CdSe/ZnS/CdZnS quantum dots so prepared) was evenly divided into 8 centrifuge tubes in an inert atmosphere box. 16.6 mL of n-butanol and 8.3 mL of methanol (both anhydrous and oxygen free) were then sequentially added sequentially to the tube. The centrifuge tubes were then capped and vortexed on a vortex genie for 20 seconds. The tubes were then placed in a centrifuge and spun at 4000 rpm for 2 minutes.

The tubes were opened in the inert gas box and the centrate was poured off of the tubes. The tubes were inverted on a paper wiper for 2 minutes to allow any remaining centrate to drain from the tubes.

To each tube was added 10 mL of lauryl methacrylate monomer. The QD containing centrifuge pellet in each tube was broken up with a blunt needle attached to a syringe barrel. The tubes were then capped and vortexed until the quantum dot pellet was redispersed. The quantum dot/ monomer solutions from each centrifuge tube were then transferred to a central collection container. The empty centrifuge tubes were then rinsed with 1-2 mL of lauryl methacrylate and the rinses combined into the central collection container. The central collection container was capped and wrapped with tape as a seal.

A small aliquot of the solution was removed to determine the concentration of quantum dots by visible light absorption at 450 nm using a UV-Vis spectrophotometer. Emission peak wavelength of the solutions and full width half maximum of the emission lines was determined using a spectrofluorimeter.

Example 5 Preparation of Cyclohexyl Acrylate Pre-Mix. (with Cross-Linker)

A Schlenk flask equipped with a magnetic stir bar was charged with 6.0 g of CAB-O-SIL TS-720 treated fumed silica (Cabot Corporation), 26.45 g of cyclohexyl acrylate monomer (Aldrich Chemical), and 9.9 d of dodecanedioldimethacrylate ($D_3DMA$, Aldrich Chemical) was added to the flask with stirring to wet out the silica. 3.15 g of trioctylphosphine oxide, 0.32 g of dipotassium dodecyl phosphate and 10 g of additional cyclohexyl acrylate monomer.

The Schlenk flask was then capped with a rubber septum, agitated to wet out all contents and sonicated for 30 minutes in a room temperature water bath/sonicator. After sonication, the septum was removed and the fluid was dispersed in the flask using a rotor-stator disperser at 9800 rpm for 15 minutes.

Example 6 Preparation of Cyclohexyl Acrylate Coating Fluid (with Cross-Linker)

A Schlenk flask equipped with a magnetic stir bar was charged with 18.65 g of coating fluid pre-mix and 0.82 mL of additional cyclohexyl acrylate monomer. The flask was then sealed with a rubber septum and vacuum was carefully applied until the flask pressure was reduced to <200 mtorr. The flask was then back filled with nitrogen and allowed to stir for two minutes. This vacuum degas procedure was repeated two additional times, leaving the coating solution under nitrogen.

The Schlenk flask containing the coating fluid was then transferred into an inert atmosphere box and to it were added while magnetically stirring 0.105 mL of red quantum dot/ monomer solution from example 4 and 0.441 mL of green quantum dot/monomer solution from example 3.

Example 7 Preparation of Laurylacrylate Pre-Mix. (with Cross-Linker) (for Comparative Example)

A Schlenk flask equipped with a magnetic stir bar was charged with 6.0 g of CAB-O-SIL TS-720 treated fumed silica (Cabot Corporation), 26.45 g of laurylacrylate monomer (Aldrich Chemical), and 9.9 d of dodecanedioldimethacrylate ($D_3DMA$ Aldrich Chemical) was added to the flask with stirring to wet out the silica 3.15 g of trioctylphosphine oxide, 0.32 g of dipotassium dodecyl phosphate and 10 g of additional laurylacrylate monomer.

The Schlenk flask was then capped with a rubber septum, agitated to wet out all contents and sonicated for 30 minutes in a room temperature water bath/sonicator. After sonication, the septum was removed and the fluid was dispersed in the flask using a rotor-stator disperser at 9800 rpm for 15 minutes.

Example 8 Preparation of Laurylacrylate Coating Fluid. (with Cross-Linker) (for Comparative Example)

A Schlenk flask equipped with a magnetic stir bar was charged with 18.65 g of coating fluid pre-mix and 0.82 mL of additional laurylacrylate monomer. The flask was then sealed with a rubber septum and vacuum was carefully applied until the flask pressure was reduced to <200 mtorr. The flask was then back filled with nitrogen and allowed to stir for two minutes. This vacuum degas procedure was repeated two additional times, leaving the coating solution under nitrogen.

The Schlenk flask containing the coating fluid was then transferred into an inert atmosphere box and to it were added while magnetically stirring, 0.105 mL of red quantum dot/ monomer solution from example 4 and 0.441 mL of green quantum dot/monomer solution from example 3.

Example 9 Preparation of Cyclohexyl Acrylate Pre-Mix. (No Cross-Linker; with LOCTITE 3195)

A Schlenk flask equipped with a magnetic stir bar was charged with 6.0 g of CAB-O-SIL TS-720 treated fumed silica (Cabot Corporation) and 35.34 g of cyclohexyl acrylate monomer (Aldrich Chemical) was added to the flask with stirring to wet out the silica. 3.15 g of trioctylphosphine oxide, 0.32 g of dipotassium dodecyl phosphate and 10 g of additional cyclohexyl acrylate monomer.

The Schlenk flask was then capped with a rubber septum, agitated to wet out all contents and sonicated for 30 minutes in a room temperature water bath/sonicator. After sonication, the septum was removed and the fluid was dispersed in the flask using a rotor-stator disperser at 9800 rpm for 15 minutes.

Example 10 Preparation of Cyclohexyl Acrylate Coating Fluid. (with Cross-Linker, and LOCTITE 3195)

A Schlenk flask equipped with a magnetic stir bar was charged with 15.0 g of coating fluid pre-mix and 3.15 g of additional cyclohexyl acrylate monomer and either 1.0 g (5%) or 0.5 g (2.5%) of LOCTITE 3195 (Henkel Corp.). The flask was then sealed with a rubber septum and vacuum was carefully applied until the flask pressure was reduced to <200 mtorr. The flask was then back filled with nitrogen and allowed to stir for two minutes. This vacuum degas procedure was repeated two additional times, leaving the coating solution under nitrogen.

The Schlenk flask containing the coating fluid was then transferred into an inert atmosphere box and to it were added while magnetically stirring, 0.105 mL of red quantum dot/ monomer solution from example 4 and 0.444 mL of green quantum dot/monomer solution from example 3.

Example 11 Preparation of Cyclohexyl Acrylate Pre-Mix. (for Adhesion Promoter and Cure Time Studies)

A Schlenk flask equipped with a magnetic stir bar was charged with 10 g of CAB-O-SIL TS-720 treated fumed silica (Cabot Corporation), 4.0 g LOCTITE 3195 (Henkel Corp.) and 67.534 g of cyclohexyl acrylate monomer (Aldrich Chemical) was added to the flask with stirring to wet out the silica. 5.25 g of trioctylphosphine oxide, 0.53 g of dipotassium dodecyl phosphate and 10 g of additional cyclohexyl acrylate monomer.

The Schlenk flask was then capped with a rubber septum, agitated to wet out all contents and sonicated for 30 minutes in a room temperature water bath/sonicator. After sonication, the septum was removed and the fluid was dispersed in the flask using a rotor-stator disperser at 9800 rpm for 15 minutes.

Example 12 Preparation of Cyclohexyl Acrylate Coating Fluid. (for Adhesion Promoter and Cure Time Study)

A Schlenk flask equipped with a magnetic stir bar was charged with 9.16 g of coating fluid pre-mix and 0.5 g of PL-2110 (Esstech Industries) or bis[2-(methacryloyloxy)-ethyl]phosphate (BMEP, Aldrich Corp.) as an adhesion promoter. Additional 0.08 g of cyclohexylacrylate was added to the mixture. The flask was then sealed with a rubber septum and vacuum was carefully applied until the flask pressure was reduced to <200 mtorr. The flask was then back filled with nitrogen and allowed to stir for two minutes. This vacuum degas procedure was repeated two additional times, leaving the coating solution under nitrogen.

The Schlenk flask containing the coating fluid was then transferred into an inert atmosphere box and to it were added while magnetically stirring 0.053 mL of red quantum dot/monomer solution from example 4 and 0.2109 mL of green quantum dot/monomer solution from example 3.

Example 13 Use of Adhesion Promoter as a Tie Layer

A top barrier film and bottom barrier film substrate were prepared by cutting Mitsubishi Type C barrier films into two pieces measuring 6"×4" and 7" 5" respectively. These were taped to a glass pane with the barrier side facing up. The glass/barrier film samples were placed on a spin coating machine 2.0 mL of 0.5% w/w solution of bis[2-(methacryloyloxy)-ethyl]phosphate (BMEP; Aldrich Corp.) in methanol was flooded onto the center of the film and the unit was immediately spun at 2000 rpm for 1 minute. The coated film was removed from the spin coater and placed in a hood to air dry overnight.

Example 14 Preparation of Optical Test Films

A top barrier film and bottom barrier film substrate were prepared by cutting Mitsubishi Type C barrier films into two pieces measuring 6"×4" and 7"×5" respectively. Two pressure sensitive adhesive films (PSA; 8172EL; 3M Corp.) were cut to 5.75"×3.75". Finally, a diffuser film (100 SXE bead film; KIMOTO Tech Inc.) was cut to a 6"×4" dimension.

The protective release layer was removed from one side of the PSA film which was then laminated to the optical diffuser film using an electrical roll laminator. Similarly, the protective release layer was removed from one side of the second PSA film which was then laminated to the barrier side of the Mitsubishi top barrier film. Finally, the remaining release layer was removed from the PSA on the diffuser/PSA stack which was then laminated to the PET side (non-PSA side) of the top barrier film/PSA stack to make an assembled upper film stack.

To prepare the coating fluid, scintillation vial equipped with a rubber septum cap was transferred into an inert gas box and charged with 2 mL of the quantum dot coating fluid prepared in previous examples. To this was added 18.4 µL of IRGACURE 2022 photoinitiator. The vial was capped, shaken and removed from the glove box.

The remaining bottom barrier film substrate film was cleaned with a "lint roller" and played on the vacuum platen of an automatic blade coater draw down machine, making sure that the barrier side of the Mitsubishi Type C barrier film was facing up. A bird-type "Box" blade was positioned on top of the barrier film making sure the correct blade was selected to give a 5 mil (125 µm) wet film drawdown. Using a pipette, the previously prepared coating solution from one scintillation vial was evenly transferred across the barrier film close to, and parallel to, the coating blade edge. The auto-drawdown machine was then actuated drawing a smooth film of coating fluid across the barrier film.

The barrier film was removed from the vacuum platen and carefully transferred to, and taped down to a glass plate. This assembly was placed in a nitrogen inerted photocuring station equipped with a D-bulb metal halide lamp and timed shutter system. The film was allowed to sit for 30 seconds to establish a nitrogen blanket. After this time, the shutter was opened and the film exposed to the curing light for 30 seconds after which time the shutter closed (50 mW/cm$^2$ peak power, 1500 mJ/cm$^2$ energy).

The thickness of the cured QD film was measured using a film micrometer and determined to be 70 µM.

Figure 2:
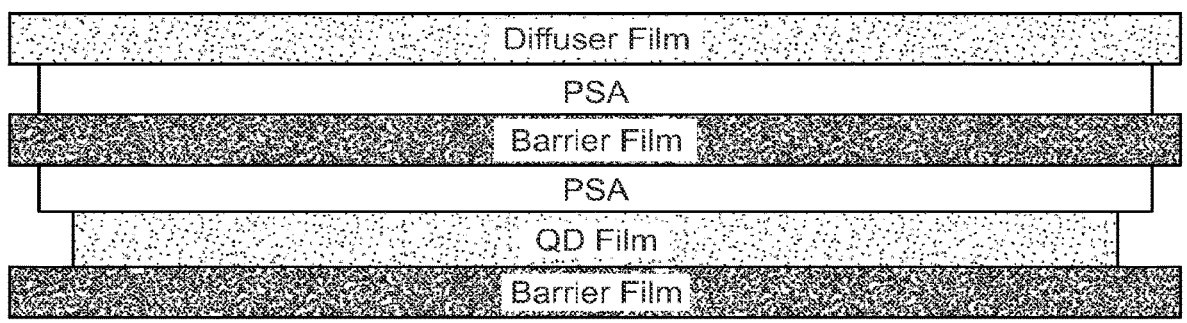
FIG. 2 graphically depicts the structure of an optical film described and used for testing in the Examples.

To assemble the final test film, the protective release layer was removed from one side of the Top diffuser/barrier film stack. This was then laminated to the QD film side of the QD/barrier film stack using an electrical roll laminator. The final assembled stack structure is depicted in FIG. 2

Example of Adhesion Testing.

0.5 ml of pre-polymer formulation is evenly coated across the top surface of a 2.5×3.5 piece of barrier film by using a #28 Meyer rod. A second piece of barrier film is coated with pre-polymer formulation by the same method. The two pieces of coated film are then press together with the coated sides of the two pieces of barrier film facing each other, and cured for 30 seconds in a Dymax UV curing station under the same conditions used to prepare the optical film samples (as described above). The resulting cured film was cut into 1 inch strips for adhesion testing. The sample is tested using a standard T-peel protocol in an Instron. Data is analyzed MTEST Quattro software to generate the amount of force needed to initiate and propagate peeling of the adhered barrier films from each other.

Film Luminance, Color, and Edge Ingress Measurements

Luminance and color point measurements were obtained using an edge-lit configured backlight unit deconstructed from a commercially available 2013 7 inch Kindle Fire HDX from which films included on the light emitting face of the light guide plate of the backlight unit of the commercial product were removed: the opposite face included an enhanced specular reflector.

A test film is placed on the light emitting surface of a light guide plate. Crossed brightness enhancing films (BEFs) are positioned over the test film, an MCET mask with a 15 mm square aperture centered in the module is placed over the crossed-BEFS, the aperture being positioned over the position of the test film on the light guide place. A metal frame is used to hold the arrangement in place. ((BEFs) are included to more closely simulate the conditions inside a typical display backlight unit.) After the test arrangement is assembled, the LED light strip at the edge of light guide plate is driven at 120 milliamps constant current, to illuminate the test film/crossed-BEF stack with blue (450 nm) light. The light output from the light-emitting surface of the light guide plate including the test film/crossed BEF stack is measured with a Konica Minolta CS-200 Chromameter (a luminance colorimeter (1° measuring angle (~5 mm spot size): 2° observer). Measurements were taken in the dark at room temperature.

Figure 5:
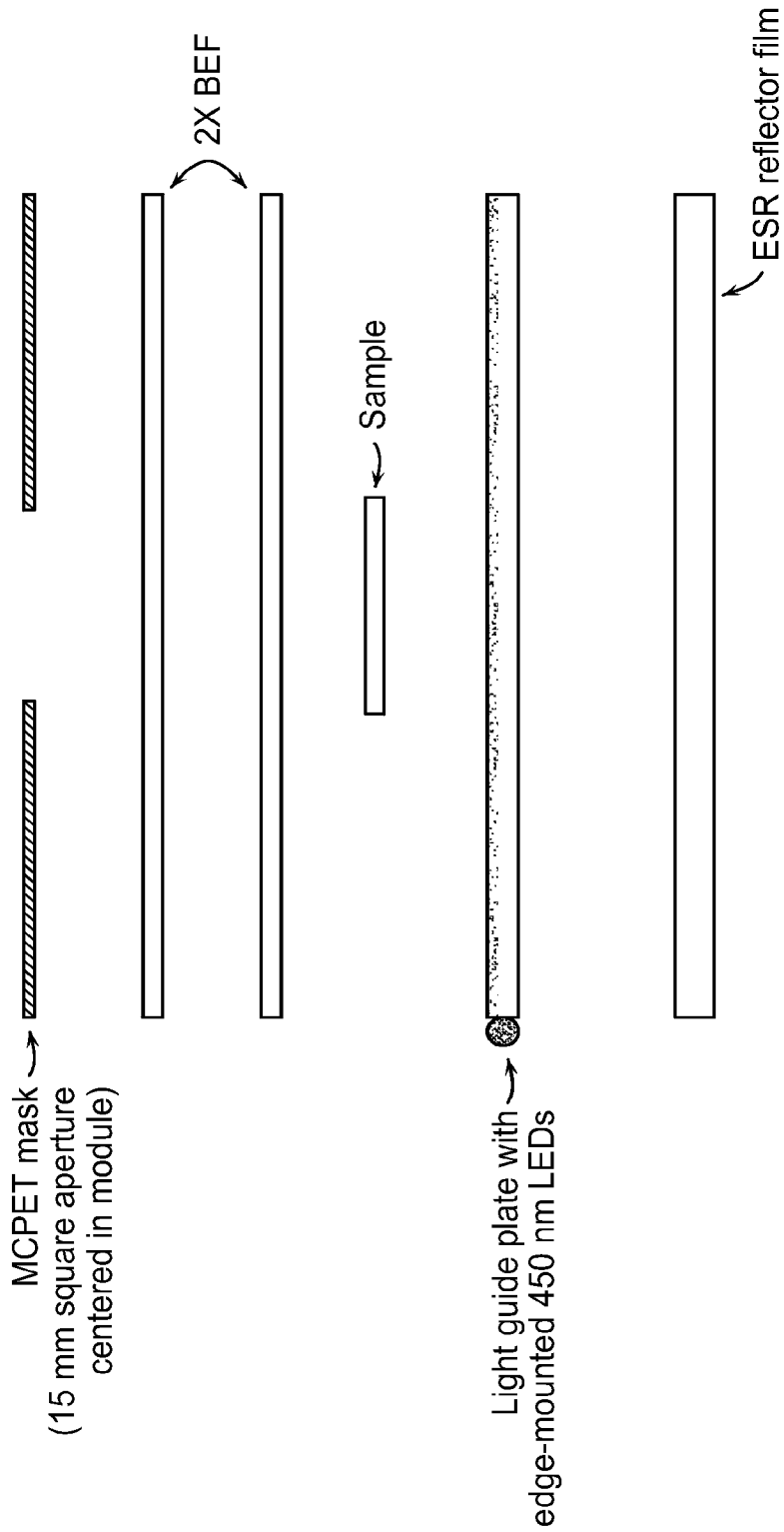
FIGS. 5 & 6 show schematic representations of the measurement system referred to in the Examples.
Figure 6:
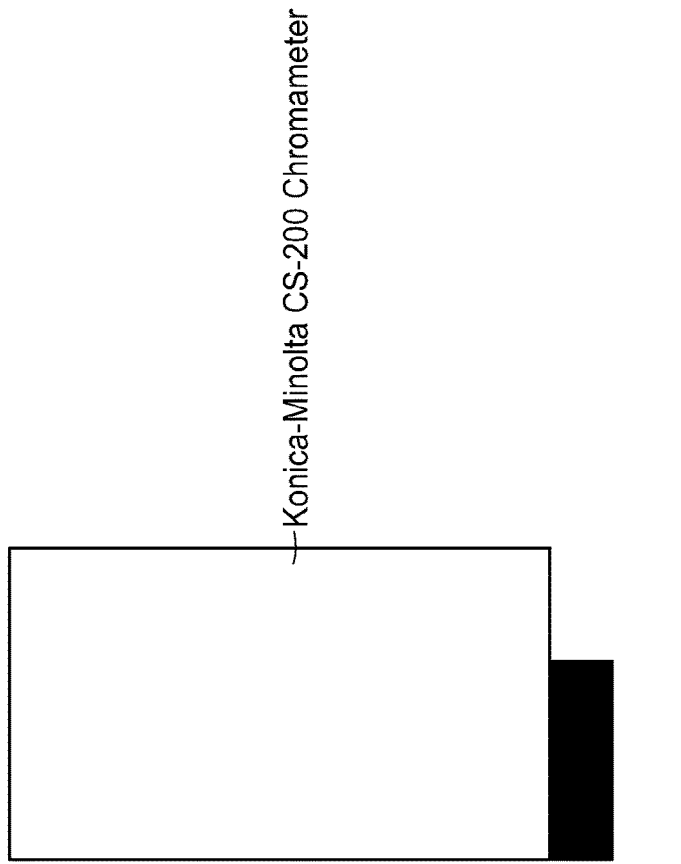
Figure 7:
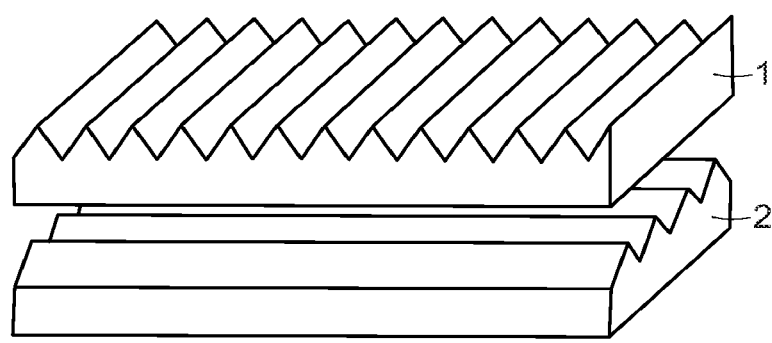
FIG. 7 shows an example of a configuration of crossed-BEFs.

FIG. 5 depicts an exploded view of a schematic of the backlight testing assembly used in measuring the film properties. FIG. 6 depicts a schematic backlight testing assembly with the luminance colorimeter (e.g., a Konica Minolta CS-200 Chromameter). FIG. 7 depicts an example of a crossed arrangement of two BEFs 1, 2 (each depicted with a prism surface).

To perform edge-ingress measurements, a picture of the film on a flat 470 nm light box (Metaphase Technologies 9.9"×470 nm lightbox part #MB-OBL9×9-B-24) is captured using an Edmund Optics USB camera (Edmund Optics EO-1918C) equipped with a 12 mm compact fixed focal length lens and a 495 nm longpass filter to block the 470 nm light and allow the film emission to constitute the major part of the image. Images are captured using uEye camera interface and image capture software.

The image is converted to monochrome for analysis and then analyzed using custom-developed software using the LabView software platform. The software analyzes the image to find the center of the film and then measures pixel intensity as a function of distance along a straight line through the film center. The software then determines the intensity of the center area (by averaging several pixels there). The trace is then analyzed by the software to determine the two points that are one-half of the center value. Using a known pixel/mm scale, the distance between these two points is calculated Subtracting this distance from the known extents of the film and dividing by two gives the amount of ingress on one edge of the film.

Figure 1B:
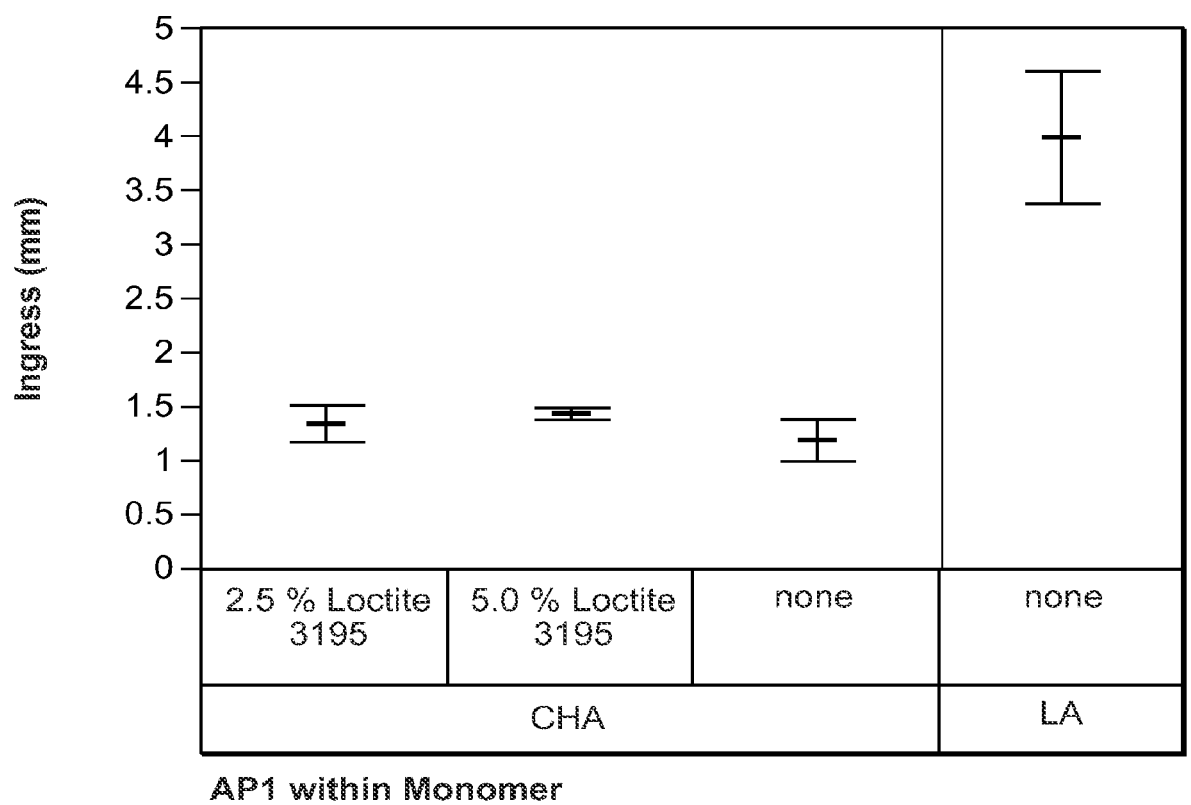
FIG. 1B graphically represents edge ingress performance (measured in mm) for optical films including a quantum dot-containing layer prepared from formulations as described in Examples 5-10.
Figure 1C:
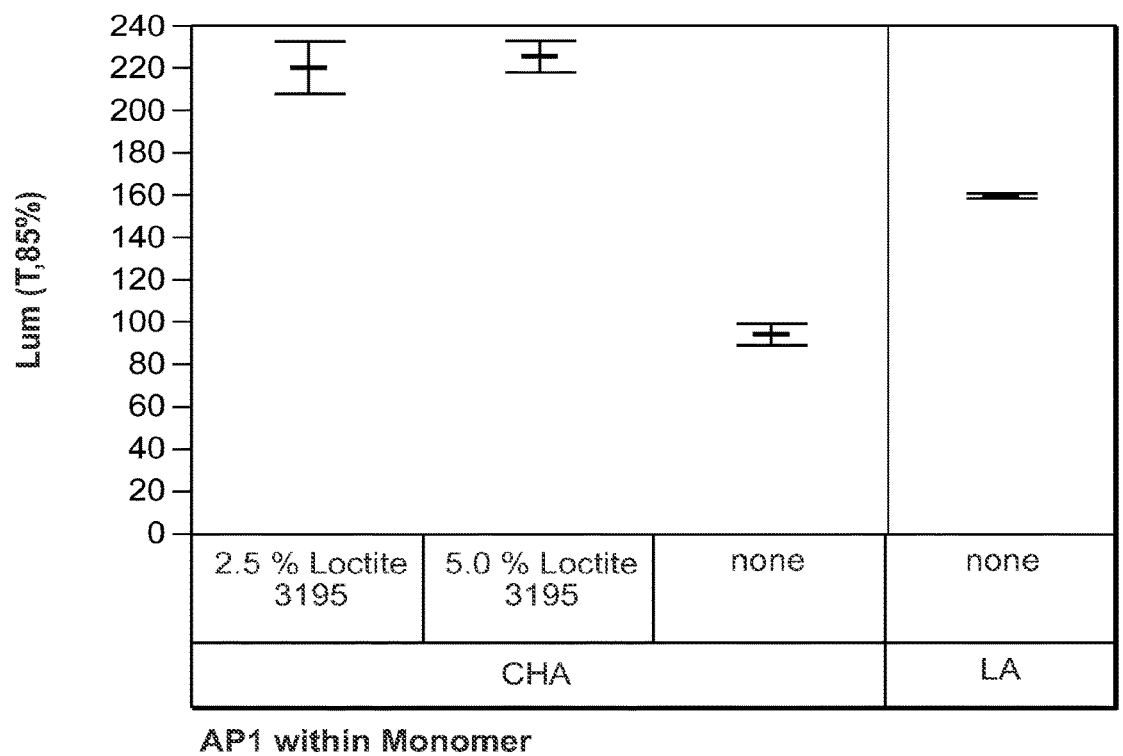
FIG. 1C graphically represents time (in hours) from peak luminance to 85% drop in peak luminance for optical films including a quantum dot-containing layer prepared from formulations as described in Examples 5-10.

Data relating to ingress of film samples for formulations as described in Examples 5, 6, 7, 8 & 9 are depicted in FIG. 1B. The test samples included no perimeter seal around the edge of the optical stack. In other words, the layer comprising the quantum dot composition included in the optical film included in the test stack was exposed to ambient conditions (including, e.g., air) at the edge of the stack.

Advantageously, edge ingress is reduced for samples including a quantum dot composition including a cyclohexylacrylate polymer matrix rather than a lauryl acrylate polymer. Such reduced ingress can result in improvement of one or more performance properties of an optical film and an optical component including a quantum dot composition in accordance with the present invention.

As shown in the examples, cyclohexylacrylate-based polymer improves (reduces) ingress due to its low free volume of diffusion. Edge ingress for polycyclohexyl acrylate is reduced compared to that of polylauryl acrylate. Edge ingress for polycyclohexyl acrylate is also expected to be lower than that for PLMA.

The free volume parameter $V_{FH2}/\gamma$ values (at 298K) for poly-cyclohexylacrylate, poly-laurylacrylate, and poly-laurylmethacrylate are listed in the following table:

| POLYMER | $V_{FH2}/\gamma$ @ 298 K (cm³/g) |
|---|---|
| Poly-laurylmethacrylate | 0.0377 |
| Poly-laurylacrylate | 0.1148 |
| Poly-cyclohexylacrylate | 0.0292 |

Measurements of the film emission spectrum are taken using an Ocean Optics USB 4000 spectrometer connected via optical fiber to a collimating lens (Ocean Optics UV-74) oriented normal to the test sample and collecting light from the center of the sample at a distance of 118 mm. Ocean Optics SpectraSuite software is used to gather data from the spectrometer, which is converted via calibration (with an Ocean Optics LS-1 calibration lamp) to a measurement of Irradiance vs. Wavelength. For this test, the sample is mounted in a backlight testing assembly identical to that used for luminance and color measurements and shown in FIG. 5. A schematic of emission spectrum test assembly is shown in FIG. 6.

Figure 3A:
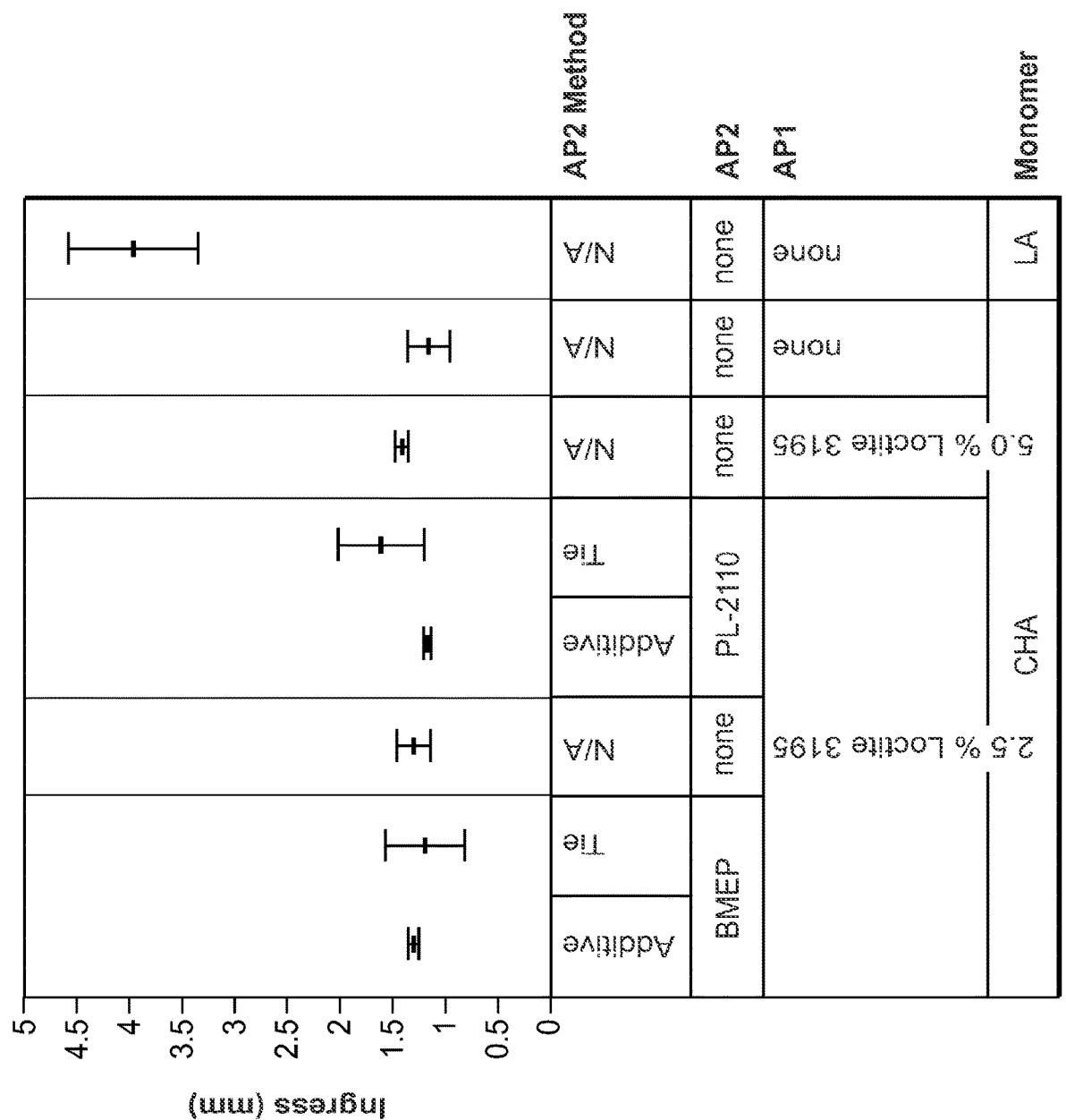
FIG. 3A graphically represents edge ingress performance (measured in mm) for optical films including a quantum dot-containing layer prepared from formulations as described in Examples 5-12.
Figure 3B:
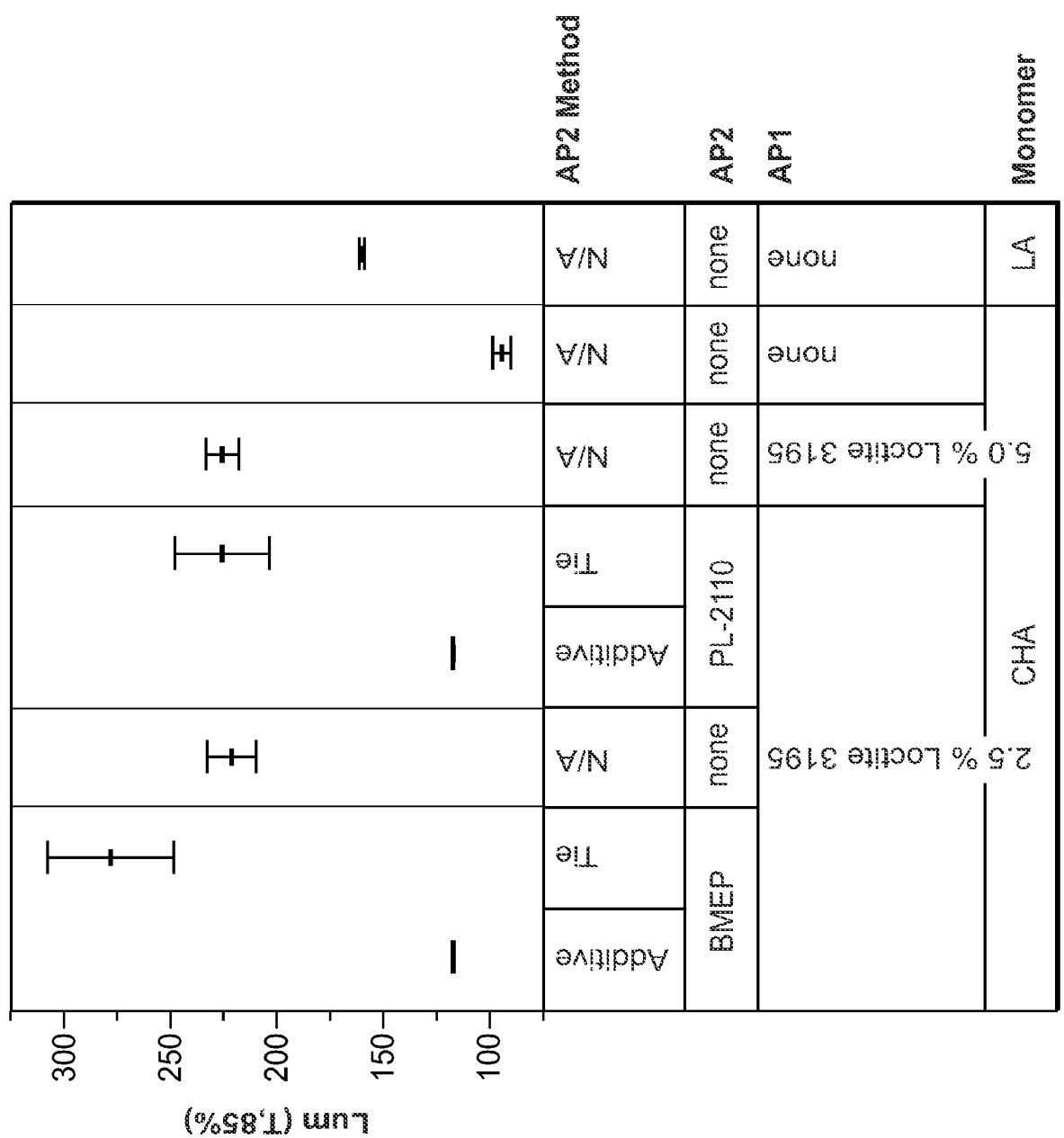
FIG. 3B graphically represents time (in hours) for luminance drop to 85% of peak luminance for an optical film including a quantum dot-containing layer prepared from formulations as described in Examples 5-12.
Figure 3C:
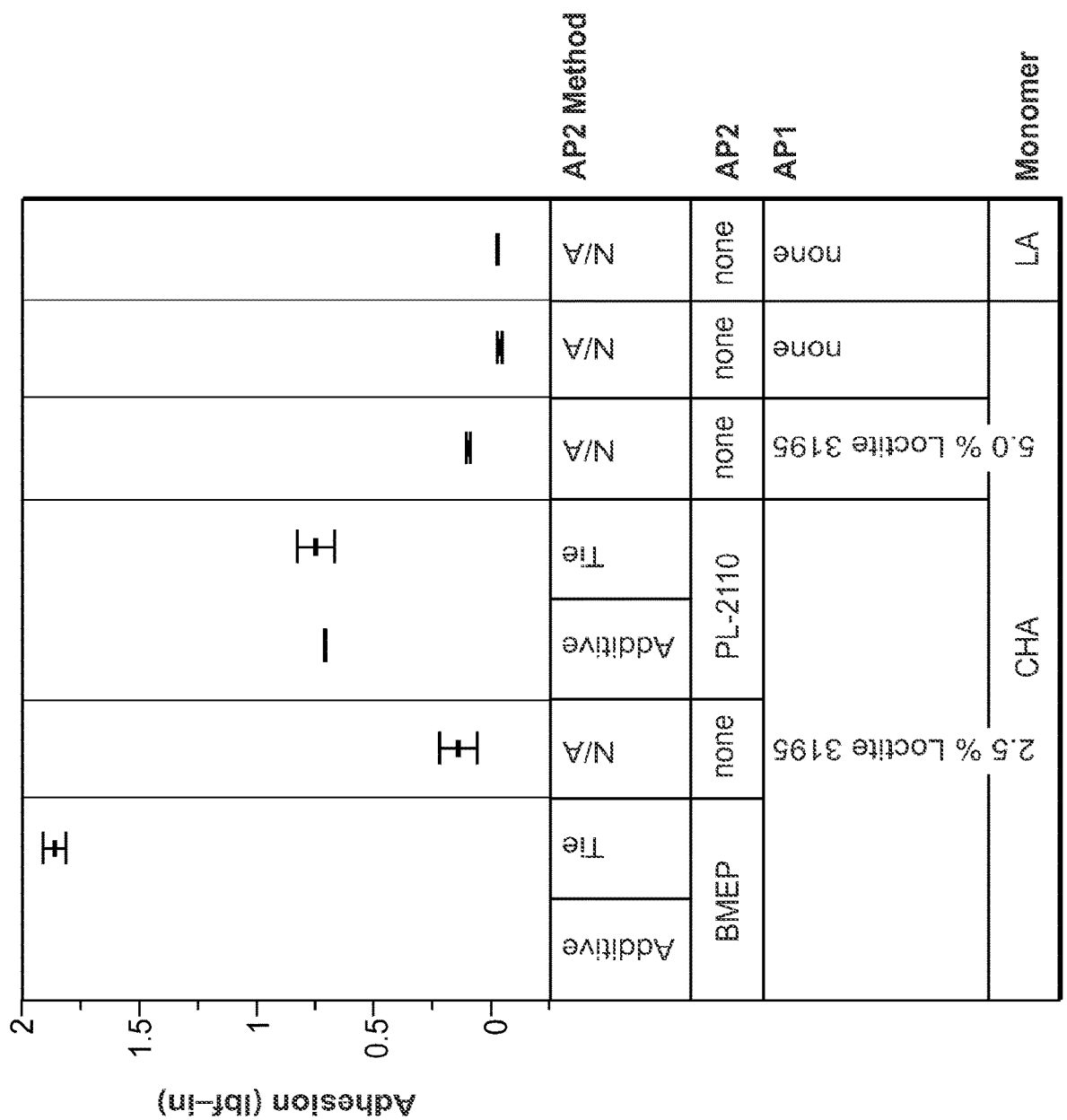
FIG. 3C graphically represents adhesion (measured in pound force inch (lbf-in)) for an optical film including a quantum dot-containing layer prepared from formulations as described in Examples 5-12.
Figure 4A:
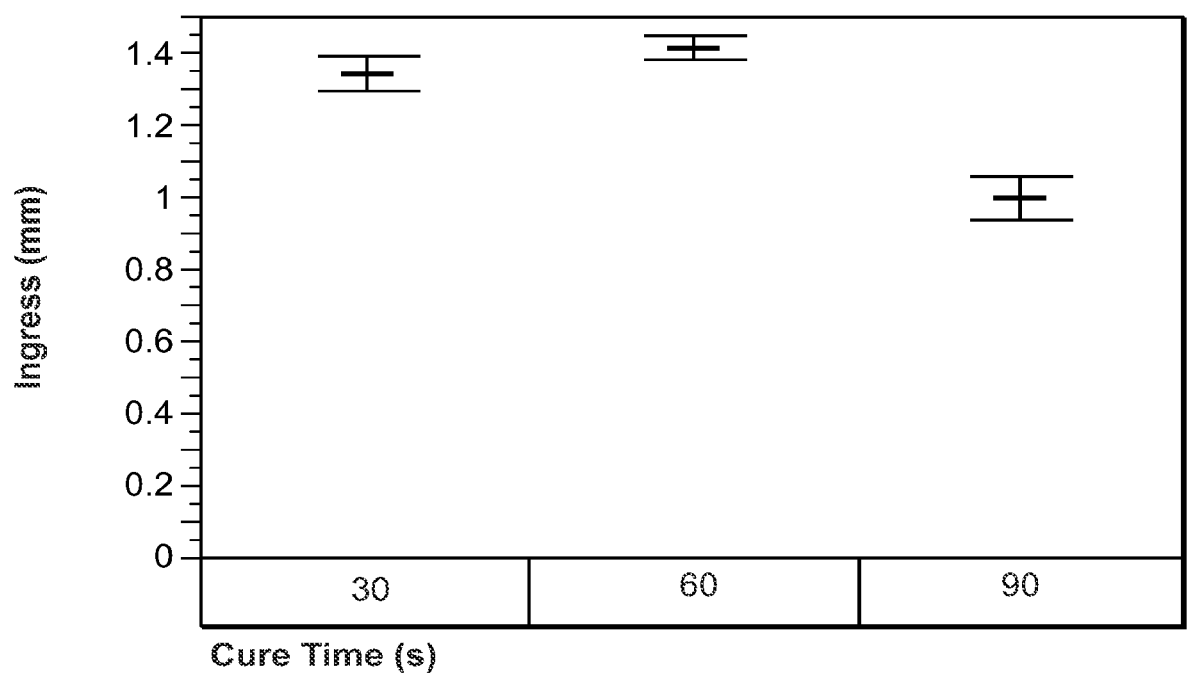
FIG. 4A graphically represents edge ingress performance (measured in mm) for an optical film including a quantum dot-containing layer (including 25 weight percent LOCTITE 3195 (a UV acrylic adhesive liquid) and 0.5 weight percent bis[2-(methallyloxy)ethyl]phosphate (BMEP) in the cyclohexylacrylate-based polymer matrix) as a function of curing time.
Figure 4B:
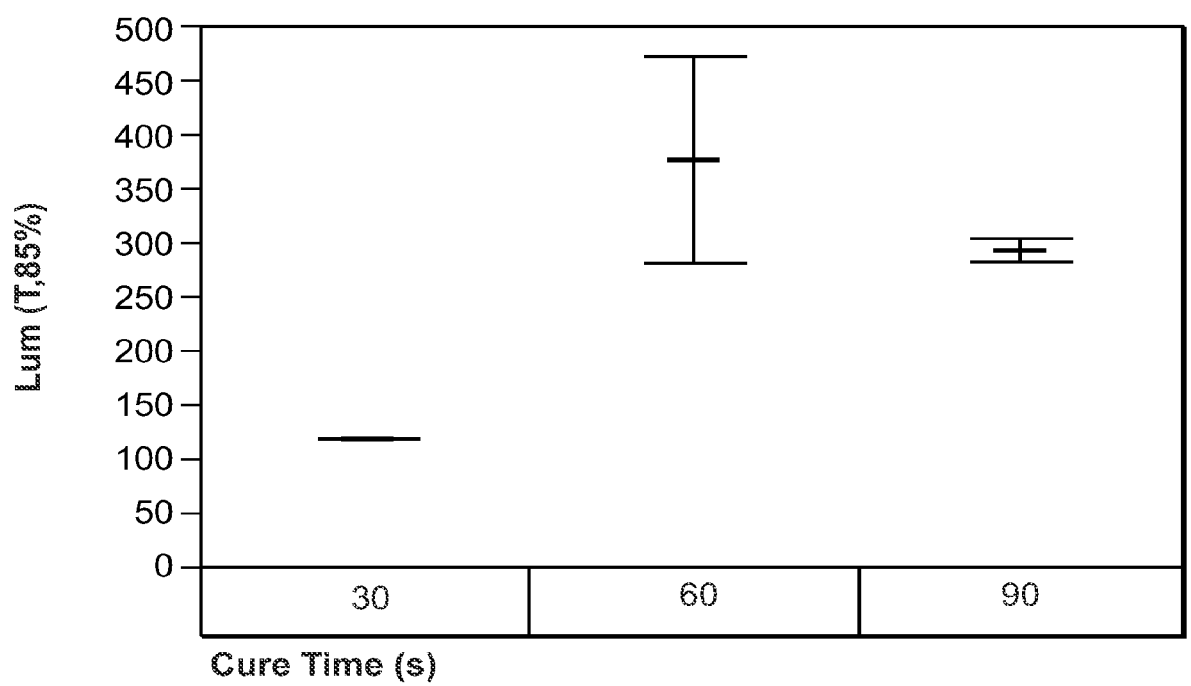
FIG. 4B graphically represents time (in hours) for luminance drop to 85% of peak luminance for an optical film including a quantum dot-containing layer (including 2.5 weight percent LOCTITE 3195 (a UV acrylic adhesive liquid) and 0.5 weight percent BMEP in the cyclohexylacrylate-based polymer matrix) as a function of curing time.

Data obtained for ingress testing, measurements of time (in hours) for luminance drop to 85% of peak luminance, and adhesion testing for films prepared as described in the Examples is depicted in FIGS. 1A-1C, 3A-3C, and 4A-4B. The comparative examples included a laurylacrylate polymer matrix in which quantum dots were dispersed, prepared as described in the Examples. The data for the comparative example samples is designated by "LA" as the Monomer in the referenced figures. The data relating to examples of the present invention is designed by "CHA" (cyclohexyl acrylate) as the monomer in the referenced figures. In the referenced figures. AP1 identifies test samples that included LOCTITE 3195 in pre-polymer formulation used to make the film tested, and the amount of LOCTITE 3195 included, if any. In FIGS. 3A-3C, AP2 identifies any second adhesion promoter included in a test sample, and "APs Method" identifies how the second adhesion promoter was included in the film, if applicable. The AP2 Method designated "Additive" identifies that the second adhesion promoter was included in the pre-polymer formulation as an additive in addition to AP1 (LOCTITE 3195). The AP2 Method designated "Tie" identifies that the second adhesion promoter was not added to the formulation but rather spin coated onto the barrier side of the barrier film prior to use as described in the examples. FIGS. 4A and 4B provide data for examples of an embodiment of an optical film prepared from a pre-polymer formulation, as described in the pertinent examples, including an adhesion promoter including 2.5 weight percent LOCTITE 3195 and 0.5 weight percent BMEP. FIG. 4A shows ingress (in mm) for examples of an embodiment of an optical film within the scope of the present invention including a quantum dot-containing layer prepared from an embodiment of a pre-polymer formulation, as described in the pertinent examples, including a mixture of adhesion promoters (2.5 weight percent LOCTITE and 0.5 weight percent BMEP) as an additive included in the formulation (as opposed to in a tie layer)) as a function of curing time. FIG. 4B shows time (in hours) for luminance drop to 85% of peak luminance for examples of an embodiments of an optical film within the scope of the present invention including a quantum dot-containing layer prepared from an embodiment of a pre-polymer formulation, as described in the pertinent examples, including a mixture of adhesion promoters (2.5 weight percent LOCTITE and 0.5 weight percent BMEP) as an additive included in the formulation (as opposed to in a tie layer)) as a function of curing time.

Quantum dots (which may also be referred to herein as semiconductor nanocrystals) are nanometer sized semiconductor particles that can have optical properties arising from quantum confinement. Quantum dots preferably have an average particle size in a range from about 1 to about 100 nm. In certain embodiments, quantum dots have an average particle size in a range from about 1 to about 20 nm (e.g., such as about 5, 6, 7, 8, 9, 10, 11, 12, 13, 14, 15, 16, 17, 18, 19, or 20 nm). In certain embodiments, quantum dots have an average particle size in a range from about 1 nm to about 20 nm or about 1 nm to about 10 nm. Quantum dots can have an average diameter less than about 150 Angstroms (Å). In certain embodiments, quantum dots having an average diameter in a range from about 12 to about 150 Å can be particularly desirable. However, depending upon the composition, structure, and desired emission wavelength of the quantum dot, the average diameter may be outside of these ranges.

Quantum dots can have various shapes, including, but not limited to, sphere, rod, disk, other shapes, and mixtures of various shaped particles. The particular composition(s), structure, and/or size of a quantum dot can be selected to achieve the desired wavelength of light to be emitted from the quantum dot upon stimulation with a particular excitation source. In essence, quantum dots may be tuned to emit light across the visible spectrum by changing their size. The narrow FWHM of quantum dots can result in saturated color emission.

A quantum dot can comprise one or more semiconductor materials. Examples of semiconductor materials that can be included in a quantum dot (including, e.g., semiconductor nanocrystal) include, but are not limited to, a Group IV element, a Group II-VI compound, a Group II-V compound, a Group III-VI compound, a Group III-V compound, a Group IV-V compound, a Group compound, a Group II-IV-VI compound, a Group H-IV-V compound, an alloy including any of the foregoing, and/or a mixture including any of the foregoing, including ternary and quaternary mixtures or alloys. A non-limiting list of examples include ZnO, ZnS, ZnSe, ZnTe, CdO, CdS, CdSe, CdTe, MgS, MgSe, GaAs, GaN, GaP, GaSe, GaSb, HgO, HgS, HgSe, HgTe, InAs, InN, InP, InSb, AlAs, AlN, AlP, AlSb, TlN, TiP, TIAs, TlSb, PbO, PbS, PbSe, PbTe, Ge, Si, an alloy including any of the foregoing, and/or a mixture including any of the foregoing, including ternary and quaternary mixtures or alloys.

In certain embodiments, quantum dots can comprise a core comprising one or more semiconductor materials and a shell comprising one or more semiconductor materials, wherein the shell is disposed over at least a portion, and preferably all, of the outer surface of the core. A quantum dot including a core and shell is also referred to as a "core/shell" structure.

A shell can be a semiconductor material having a composition that is the same as or different from the composition of the core. The shell can comprise an overcoat including one or more semiconductor materials on a surface of the core. Examples of semiconductor materials that can be included in a shell include, but are not limited to, a Group IV element, a Group II-VI compound, a Group II-V compound, a Group II-VI compound, a Group I-V compound, a Group IV-VI compound, a Group compound, a Group II-IV-VI compound, a Group II-IV-V compound, alloys including any of the foregoing, and/or mixtures including any of the foregoing, including ternary and quaternary mixtures or alloys. Examples include, but are not limited to, ZnO, ZnS, ZnSe, ZnTe, CdO, CdS, CdSe, CdTe, MgS, MgSe, GaAs, GaN, GaP, GaSe, GaSb, HgO, HgS, HgSe, HgTe, InAs, InN, InP, InSb, AlAs, AlN, AlP, AlSb, TlN, TlP, TAs, TlSb, PbO, PbS, PbSe, PbTe, Ge, Si, an alloy including any of the foregoing, and/or a mixture including any of the foregoing. For example, ZnS, ZnSe or CdS overcoatings can be grown on CdSe or CdTe semiconductor nanocrystals.

In a core/shell quantum dot, the shell or overcoating may comprise one or more layers. The overcoating can comprise at least one semiconductor material which is the same as or different from the composition of the core. Preferably, the overcoating has a thickness from about one to about ten monolayers. An overcoating can also have a thickness greater than ten monolayers. In certain embodiments, more than one overcoating can be included on a core. In certain embodiments, the surrounding "shell" material can have a band gap greater than the band gap of the core material. In certain other embodiments, the surrounding shell material can have a band gap less than the band gap of the core material.

In certain embodiments, the shell can be chosen so as to have an atomic spacing close to that of the "core" substrate. In certain other embodiments, the shell and core materials can have the same crystal structure.

Methods of making quantum dots are known One example of a method of manufacturing a quantum dot (including, for example, but not limited to, a semiconductor nanocrystal) is a colloidal growth process. Colloidal growth occurs by injection an M donor and an X donor into a hot coordinating solvent One example of a preferred method for preparing monodisperse quantum dots comprises pyrolysis of organometallic reagents, such as dimethyl cadmium, injected into a hot, coordinating solvent. This permits discrete nucleation and results in the controlled growth of macroscopic quantities of quantum dots. The injection produces a nucleus that can be grown in a controlled manner to form a quantum dot. The reaction mixture can be gently heated to grow and anneal the quantum dot. Both the average size and the size distribution of the quantum dots in a sample are dependent on the growth temperature. The growth temperature for maintaining steady growth increases with increasing average crystal size. Resulting quantum dots are members of a population of quantum dots. As a result of the discrete nucleation and controlled growth, the population of quantum dots that can be obtained has a narrow, monodisperse distribution of diameters. The monodisperse distribution of diameters can also be referred to as a "size".

The narrow size distribution of the quantum dots (including, e.g., semiconductor nanocrystals) allows the possibility of light emission in narrow spectral widths.

Size distribution during the growth stage of the reaction can be estimated by monitoring the absorption or emission line widths of the particles. Modification of the reaction temperature in response to changes in the absorption spectrum of the particles allows the maintenance of a sharp particle size distribution during growth. Reactants can be added to the nucleation solution during crystal growth to grow larger crystals.

The particle size distribution of the quantum dots (including, e.g., semiconductor nanocrystals) can be further refined by size selective precipitation with a poor solvent for the quantum dots, such as methanol/butanol. Size selective precipitation is a known technique to the skilled artisan.

The emission from a quantum dot capable of emitting light can be a narrow Gaussian emission band that can be tuned through the complete wavelength range of the ultraviolet, visible, or infra-red regions of the spectrum by varying the size of the quantum dot, the composition of the quantum dot, or both. The narrow size distribution of a population of quantum dots capable of emitting light can result in emission of light in a narrow spectral range. The population can be monodisperse and preferably exhibits less than a 15% rms (root-mean-square) deviation in diameter of such quantum dots, more preferably less than 10%, most preferably less than 5% Spectral emissions in a narrow range of no greater than about 75 nm, preferably no greater than about 60 nm, more preferably no greater than about 40 nm, and most preferably no greater than about 30 nm full width at half max (FWHM) for such quantum dots that emit in the visible can be observed.

Quantum dots can have emission quantum efficiencies such as between 0% to greater than 95%, for example in solution Preferably the solution quantum efficiency is greater than 60%, 70%, 80%, or 90%.

At least a portion of the quantum dots can further include one or more ligands attached to an outer surface of a quantum dot.

Ligands can be derived from a coordinating solvent that may be included in the reaction mixture during the growth process. Ligands can be added to the reaction mixture. Ligands can be derived from a reagent or precursor included in the reaction mixture for synthesizing the quantum dots. Ligands can be exchanged with ligands on the surface of a quantum dot. In certain embodiments, quantum dots can include more than one type of ligand attached to an outer surface.

Preferably the ligands are selected to be compatible with the medium in which quantum dots are to be included if a dispersion of the quantum dots in the medium is desired. Such selection is within the skill of the skilled artisan.

Quantum dots included in a pre-polymer formulation, quantum dot composition, optical film, or optical component are preferably selected based on the desired peak emission wavelength or combinations of wavelengths desired for the particular intend end-use application for the pre-polymer formulation, quantum dot composition, optical film, or optical component.

The total amount of quantum dots included in a pre-polymer formulation and/or quantum dot composition within the scope of the invention is preferably in a range from about 0.01 to about 25 weight percent, and any weight percent in between. For example, an amount in a range from about 0.05 weight percent to about 15 weight percent, or about 0.05 weight percent to about 5 weight percent can be desirable for various applications. An amount outside of such ranges may also be determined to be useful. The amount of quantum dots included in a pre-polymer formulation or a quantum dot composition can vary based on the particular end application.

When quantum dots that emit light with peak emission wavelengths that differ from that of other quantum dots included in a particular embodiments, the amounts of each are selected based on the desired light out-put. Such determination can be readily made by the person of ordinary skill in the relevant art. For example, the ratio of quantum dots with different peak emissions that are used in a pre-polymer formulation and/or quantum dot composition is determined by the emission peaks of the quantum dots used. For example, when quantum dots capable of emitting green light having a peak center wavelength in a range from about 514 nm to about 540 nm, and any wavelength in between whether overlapping or not, and quantum dots capable of emitting red light having a peak center wavelength in a range from about 615 nm to about 640 nm, and any wavelength in between whether overlapping or not, are used in pre-polymer formulation and/or quantum dot composition, the ratio of the weight percent green-emitting quantum dots to the weight percent of red-emitting quantum dots can be in a range from about 12:1 to about 1:1, and any ratio in between whether overlapping or not.

In certain embodiments of the present invention, quantum dots that emit wavelengths characteristic of red light are desirable. In certain preferred embodiments, quantum dots capable of emitting red light emit light having a peak center wavelength in a range from about 615 nm to about 635 nm, and any wavelength in between whether overlapping or not. For example, the quantum dots can be capable or emitting red light having a peak center wavelength of about 630 nm, of about 625 nm, of about 620 nm, of about 615 nm.

In certain embodiments of the present invention, quantum dots that emit wavelength characteristic of green light are desirable. In certain preferred embodiments, quantum dots capable of emitting green light emit light having a peak center wavelength in a range from about 520 nm to about 545 nm, and any wavelength in between whether overlapping or not. For example, the quantum dots can be capable or emitting green light having a peak center wavelength of about 520 nm, of about 525 nm, of about 535 nm, of about 540 nm.

Quantum dots (including, but not limited to, semiconductor nanocrystals) are preferably handled in a controlled (oxygen-free and moisture-free) environment, preventing the quenching of luminescent efficiency during the fabrication process.

Other materials, techniques, methods, applications, and information that may be useful with the present invention are described in: International Publication No. WO 2011/047385, published 21 Apr. 2011, of QD Vision, Inc. entitled "An Optical Component, Products Including Same, and Methods For Making Same"; International Publication No. WO 2009/151515 A1, published 17 Dec. 2009, of QD Vision, Inc., entitled "Solid State Lighting Devices Including Quantum Confined Semiconductor Nanoparticles"; International Publication No. WO 2013/078249 A1, published 30 May 2013, of QD Vision, Inc., entitled "Method of Making Quantum Dots"; International Publication No. WO 2013/122819 A1, published 22 Aug. 2013, of QD Vision, Inc., entitled "Method of Making Components Including Quantum Dots, Methods, and Products", International Publication No. WO 2013/122820 A1, published 22 Aug. 2013, of QD Vision, Inc., entitled "Method of Processing Quantum Dot Inks"; International Publication No WO 2014/018090 A1, published 30 Jan. 2014, of QD Vision, Inc., entitled "Method of Making Components Including Quantum Dots, Methods, and Products": International Publication No. WO 2013/078242 A1, published 30 May 2013, of QD Vision, Inc., entitled "Methods For Coating Semiconductor Nanocrystals"; International Publication No. WO 2013/078245 A1, published 30 May 2013, of QD Vision, Inc., entitled "Method of Making Quantum Dots"; International Publication No WO 2013/078247 A1, published 30 May 2013, of QD Vision, Inc., entitled "Methods of Coating Semiconductor Nanocrystals, Semiconductor Nanocrystals, and Products Including Same"; U S Publication No. 2013/0148376 A1, published 13 Jun. 2013, of QD Vision, Inc., entitled "Stress-Resistant Component For Use With Quantum Dots"; and U.S. Publication No 2012/0113671 A1, published 10 May 2012, of QD Vision, Inc., entitled "Quantum Dot Based Lighting", and U.S. Pat. No. 8,718,437, issued 6 May 2014, of Coe-Sullivan, et al, entitled "Compositions, Optical Component, System Including An Optical Component, Devices, And Other Products", each of the foregoing being hereby incorporated herein by reference in its entirety.

As used herein, the singular forms "a", "an" and "the" include plural unless the context clearly dictates otherwise. Thus, for example, reference to an emissive material includes reference to one or more of such materials.

Applicants specifically incorporate the entire contents of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

Although the subject matter has been described in language specific to structural features and/or methodological acts, it is to be understood that the subject matter defined in the appended claims is not necessarily limited to the specific features or acts described above Rather, the specific features and acts described above are disclosed as example forms of implementing the claims.

What is claimed is:

1. A quantum dot composition including quantum dots dispersed in a cyclohexylacrylate-based polymer matrix.

2. The quantum dot composition in accordance with claim 1, wherein an adhesion promoter is cross-linked to the polymer matrix.

3. The quantum dot composition in accordance with claim 2, wherein the adhesion promoter comprises a UV light curable optically transparent acrylic based material having adhesive properties.

4. The quantum dot composition in accordance with claim 2, wherein the adhesion promoter includes a UV light curable acrylic-based optically clear adhesive.

5. The quantum dot composition in accordance with claim 2, wherein the adhesion promoter comprises bis[2-(methyloyloxy)ethyl]phosphate.

6. The quantum dot composition in accordance with claim 2, wherein the adhesion promoter comprises a methacrylate monomer base structure including a phosphate functionality.

7. The quantum dot composition in accordance with claim 2, wherein the adhesion promoter comprises an acrylate monomer base structure including a carboxylate functionality.

8. The quantum dot composition in accordance with claim 2, wherein the adhesion promoter comprises N-methyl-aza-2,2,4-trimethylsilacyclopentane.

9. The quantum dot composition in accordance with claim 2, wherein the composition includes the adhesion promoter in an amount greater than 0 up to about 10 weight percent of the composition.

10. The quantum dot composition in accordance with claim 1, wherein composition includes quantum dots in an amount greater than 0 up to about 25 weight percent of the composition.

11. The quantum dot composition in accordance with claim 1, further including an emission stabilizer.

12. The quantum dot composition in accordance with claim 11, wherein the emission stabilizer comprises at least one of potassium dodecyl phosphate and trioctyl phosphine oxide.

13. The quantum dot composition in accordance with claim 11, wherein the composition includes the emission stabilizer in an amount greater than 0 up to about 10 weight percent of the composition.

14. The quantum dot composition in accordance with claim 1 further comprising scatterers.

15. The quantum dot composition in accordance with claim 14, wherein the composition includes the scatterers in an amount greater than 0 up to about 15 weight percent of the composition.

16. The quantum dot composition in accordance with claim 1 further comprising a thixotrope.

17. The quantum dot composition in accordance with claim 16, wherein the composition includes the thixotrope in an amount greater than 0 up to about 15 weight percent of the composition.

* * * * *